United States Patent
Zhang et al.

(10) Patent No.: US 9,961,045 B2
(45) Date of Patent: May 1, 2018

(54) SERVICE PATH CHANGING METHOD AND APPARATUS

(71) Applicant: Huawei Technologies Co., Ltd., Shenzhen (CN)

(72) Inventors: Jin Zhang, Shanghai (CN); Hai Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/364,066

(22) Filed: Nov. 29, 2016

(65) Prior Publication Data
US 2017/0078244 A1    Mar. 16, 2017

Related U.S. Application Data

(63) Continuation of application No. PCT/CN2014/078941, filed on May 30, 2014.

(51) Int. Cl.
*H04L 29/12* (2006.01)
*H04W 36/12* (2009.01)
*H04W 4/02* (2018.01)

(52) U.S. Cl.
CPC ......... *H04L 61/2503* (2013.01); *H04W 4/028* (2013.01); *H04W 36/12* (2013.01)

(58) Field of Classification Search
CPC ..... H04W 40/36; H04L 45/306; H04L 45/308
See application file for complete search history.

(56) References Cited

U.S. PATENT DOCUMENTS

| 8,379,573 B2 * | 2/2013 | Kim ........................ H04W 8/08 370/328 |
| 8,594,069 B2 * | 11/2013 | Ho ........................ H04W 99/00 370/349 |

(Continued)

FOREIGN PATENT DOCUMENTS

| CN | 102761965 A | 10/2012 |
| EP | 2466954 A1 | 6/2012 |

(Continued)

OTHER PUBLICATIONS

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401, V12.0.0, pp. 1-290, 3$^{rd}$ Generation Partnership Project, Valbonne, France (Mar. 2013).

*Primary Examiner* — Edan Orgad
*Assistant Examiner* — Emmanuel Maglo
(74) *Attorney, Agent, or Firm* — Leydig, Voit & Mayer, Ltd.

(57) ABSTRACT

The present disclosure a service path changing method and apparatus, including: determining, by an MME, that a UE needs to be handed over from a first AG to a second AG; and instructing, by the MME, the UE to notify, according to bearer information used to perform service transmission between the second AG and the UE and assigned by the second AG, a service peer end that an IP address of the UE is changed from a first IP address assigned by the first AG to a second IP address assigned by the second AG. It is not required to add the first IP address assigned to the UE by the first AG into the IP address segment maintained by the second AG, and it is unnecessary to change routing infor- (Continued)

mation of a router in a PDN to route downlink data of the UE to the second AG.

15 Claims, 10 Drawing Sheets

(56) References Cited

U.S. PATENT DOCUMENTS

| | | | | |
|---|---|---|---|---|
| 2009/0176496 A1* | 7/2009 | Li | ............ | H04L 47/767 455/437 |
| 2009/0270099 A1* | 10/2009 | Gallagher | ............ | H04W 8/08 455/435.1 |
| 2010/0040024 A1* | 2/2010 | Wu | ............ | H04W 60/04 370/331 |
| 2010/0080172 A1* | 4/2010 | Jin | ............ | H04W 60/005 370/328 |
| 2010/0184432 A1* | 7/2010 | Yano | ............ | H04W 36/12 455/435.1 |
| 2010/0272063 A1* | 10/2010 | Kato | ............ | H04W 8/082 370/331 |
| 2010/0329208 A1* | 12/2010 | Hayashi | ............ | H04L 63/126 370/331 |
| 2012/0188983 A1 | 7/2012 | Mihaly et al. | | |
| 2012/0189016 A1* | 7/2012 | Bakker | ............ | H04W 76/021 370/401 |
| 2013/0003697 A1* | 1/2013 | Adjakple | ............ | H04W 36/0011 370/331 |
| 2013/0028172 A1 | 1/2013 | Lim et al. | | |
| 2013/0044709 A1* | 2/2013 | Adjakple | ............ | H04W 76/025 370/329 |
| 2013/0083773 A1* | 4/2013 | Watfa | ............ | H04W 36/0033 370/331 |
| 2013/0170474 A1* | 7/2013 | Bi | ............ | H04W 36/0055 370/332 |
| 2013/0279475 A1* | 10/2013 | Nishida | ............ | H04W 36/14 370/331 |
| 2013/0301610 A1* | 11/2013 | Ali | ............ | H04W 36/08 370/331 |
| 2013/0308527 A1* | 11/2013 | Chin | ............ | H04W 36/0022 370/328 |
| 2013/0322407 A1* | 12/2013 | Naraha | ............ | H04W 36/0005 370/331 |
| 2013/0343325 A1* | 12/2013 | Nishida | ............ | H04W 60/04 370/329 |
| 2013/0344890 A1* | 12/2013 | Hahn | ............ | H04W 60/00 455/456.1 |
| 2014/0162671 A1* | 6/2014 | Kim | ............ | H04W 52/0212 455/452.1 |
| 2014/0169332 A1* | 6/2014 | Taleb | ............ | H04W 36/0011 370/331 |
| 2015/0131437 A1* | 5/2015 | Kim | ............ | H04W 28/0289 370/230 |
| 2015/0146688 A1* | 5/2015 | Yasuda | ............ | H04W 36/0055 370/331 |
| 2015/0223284 A1* | 8/2015 | Jain | ............ | H04W 52/0258 370/329 |
| 2015/0296424 A1* | 10/2015 | Xu | ............ | H04W 36/0033 370/331 |
| 2015/0334606 A1 | 11/2015 | Sun et al. | | |
| 2016/0183156 A1* | 6/2016 | Chin | ............ | H04W 36/0022 370/331 |
| 2016/0226922 A1* | 8/2016 | Russell | ............ | H04L 65/1016 |

FOREIGN PATENT DOCUMENTS

| | | |
|---|---|---|
| WO | 2011129107 A1 | 10/2011 |
| WO | WO 2012156171 A1 | 11/2012 |
| WO | WO 2013128513 A1 | 9/2013 |

* cited by examiner

SERVICE PATH CHANGING METHOD AND APPARATUS

CROSS-REFERENCE TO RELATED APPLICATIONS

This disclosure is a continuation of International Application No. PCT/CN2014/078941, filed on May 30, 2014, the disclosure of which is hereby incorporated by reference in its entirety.

TECHNICAL FIELD

The present disclosure relates to the field of communications technologies, and in particular, to a service path changing method and apparatus.

BACKGROUND

To meet increasingly growing user demands, in 2004, the 3rd Generation Partnership Project (3GPP) standardization organization initiated the Long Term Evolution (LTE) project for a wireless network evolution plan and the System Architecture Evolution (SAE) project for a core network evolution plan. A wireless network in the LTE project is an evolved universal terrestrial radio access network (E-UTRAN), a core network in the SAE project is an evolved packet core (EPC) network, and an E-UTRAN and an EPC constitute an evolved packet system (EPS). Network elements of an EPS include a mobility management entity (MME), a serving gateway (S-GW), a packet data network gateway (P-GW), and the like, where the MME is responsible for control plane mobility management, the S-GW is a user plane anchor of an E-UTRAN, and the P-GW is a user plane anchor of an EPC network.

In a network architecture of the foregoing EPC network, data of a user equipment (UE) can reach a packet data network (PDN) only after passing through at least three hops, namely, a base station, an S-GW, and a P-GW. To reduce a quantity of forwarding hops and a forwarding delay, an S-GW and a P-GW are generally combined into one physical device, that is, an access gateway (AG).

Based on the foregoing improved network architecture, when a UE moves from one AG to another new AG, AG handover is caused. When a UE is handed over from an old AG to a new AG, in order to route downlink data of the UE to the new AG, a router in a PDN needs to update a routing information record of the UE in a routing table of the router, and this leads to fragmentation (originally, an IP address segment maintained by each AG is continuous) of routing information in the routing table, thereby increasing time for route search and affecting forwarding efficiency.

SUMMARY

Embodiments of the present disclosure provide a service path changing method and apparatus, so as to resolve problems that fragmentation of routing table information in a router is caused when a UE performs AG handover, time for route search is increased, and forwarding efficiency is affected.

According to a first aspect, a service path changing apparatus is provided, including:

a determining module, configured to determine that a user equipment UE needs to be handed over from a first access gateway AG to a second AG; and an instructing module, configured to instruct, according to a result determined by the determining module, the UE to notify, according to bearer information used to perform service transmission between the second AG and the UE and assigned by the second AG, a service peer end that an Internet Protocol IP address of the UE is changed from a first IP address assigned by the first AG to a second IP address assigned by the second AG.

With reference to the first aspect, in a first possible implementation manner, the determining module is specifically configured to:

after receiving a tracking area update TAU request message sent by the UE, determine that the UE needs to be handed over from the first AG to the second AG; or after receiving a service request message used to request a service and sent by the UE, determine that the UE needs to be handed over from the first AG to the second AG.

With reference to the first aspect or the first possible implementation manner of the first aspect, in a second possible implementation manner, the instructing module is further configured to:

after the determining module determines that the UE needs to be handed over from the first AG to the second AG, and before the instructing module instructs the UE to notify the service peer end that the IP address of the UE is changed from the first IP address to the second IP address, send, to the second AG, a session creation request message that is for the UE and used to request to establish a session connection between the second AG and the UE, and receive a session creation response message sent by the second AG, where the session creation response message includes the bearer information and the second IP address that are assigned by the second AG; or the session creation response message includes the bearer information assigned by the second AG.

With reference to the second possible implementation manner of the first aspect, in a third possible implementation manner, if the session creation response message includes the bearer information and the second IP address, the instructing module is specifically configured to send the bearer information and the second IP address to the UE, and instruct the UE to notify, according to the bearer information, the service peer end of the second IP address and the first IP address that is assigned by the first AG; or if the session creation response message includes the bearer information, the instructing module is specifically configured to send the bearer information to the UE, and instruct the UE to request, according to the bearer information, to acquire the second IP address from the second AG, and to notify the service peer end of the second IP address and the first IP address that is assigned by the first AG.

With reference to the second or the third possible implementation manner of the first aspect, in a fourth possible implementation manner, the instructing module is specifically configured to:

send AG change indication information to the UE; and after it is determined that a packet data network PDN connection establishment request message sent by the UE according to the AG change indication information is received, send the session creation request message to the second AG.

With reference to the second, the third or the fourth possible implementation manner of the first aspect, in a fifth possible implementation manner, the session creation request message includes indication information used to indicate that an AG last accessed by the UE before the UE accesses the second AG is not the second AG, and the session creation response message further includes forwarding path destination end information; and the instructing module is further configured to: after receiving the session creation response message sent by the second AG, and before instructing the UE to notify the service peer end that the IP address of the UE is changed from the first IP address to the second IP address, send a forwarding path creation request message including the forwarding path destination end information to the first AG, and receive forwarding path start end information sent by the first AG, where the forwarding path creation request message is used to instruct the first AG to forward, to the second AG, received downlink data that needs to be sent to the UE; and send the received forwarding path start end information to the second AG.

With reference to the second, the third or the fourth possible implementation manner of the first aspect, in a sixth possible implementation manner, the session creation request message includes the first IP address of the UE, where the first IP address is used to instruct the second AG to send, to the first AG, a binding update message for binding the second IP address and the first IP address, where the binding update message is used to instruct the first AG to forward, to the second AG, received downlink data that needs to be sent to the UE.

With reference to the first aspect, or any possible implementation manner of the first to the sixth possible implementation manners of the first aspect, in a seventh possible implementation manner, the instructing module is further configured to: after the instructing module instructs the UE to notify the service peer end that the IP address of the UE is changed from the first IP address to the second IP address, if the instructing module receives a service path change notification message sent by the UE, instruct the first AG to release a session between the first AG and the UE.

According to a second aspect, a service path changing apparatus is provided, including:

a determining module, configured to determine that a user equipment UE needs to be handed over from a first access gateway AG to a second AG; and a notification module, configured to notify, according to a result determined by the determining module, a service peer end that an Internet Protocol IP address of the UE is changed from a first IP address assigned by the first AG to a second IP address assigned by the second AG.

With reference to the second aspect, in a first possible implementation manner, the determining module is specifically configured to receive bearer information used to perform service transmission between the second AG and the UE and the second IP address that are assigned by the second AG and sent by a mobility management entity MME; and the notification module is specifically configured to notify, according to the bearer information, the service peer end of the second IP address assigned by the second AG and the first IP address assigned by the first AG.

With reference to the second aspect, in a second possible implementation manner, the determining module is specifically configured to receive bearer information used to perform service transmission between the second AG and the UE, assigned by the second AG, and sent by a mobility management entity MME; and the notification module is specifically configured to request, according to the bearer information, to acquire the second IP address from the second AG, and notify the service peer end of the acquired second IP address and the first IP address that is assigned by the first AG.

With reference to the second aspect, or the first or the second possible implementation manner of the second aspect, in a third possible implementation manner, the determining module is specifically configured to:

after sending a tracking area update TAU request message to the mobility management entity MME, determine, according to TAU accept information sent by the MME, that the UE needs to be handed over from the first access gateway AG to the second access gateway AG; or after sending a service request message to the MME, determine, according to a radio bearer establishment response message sent by the MME, that the UE needs to be handed over from the first access gateway AG to the second access gateway AG.

With reference to the second aspect, or the first or the second possible implementation manner of the second aspect, in a fourth possible implementation manner, the determining module is specifically configured to:

after the determining module sends a tracking area update TAU request message or a service request message to the mobility management entity MME, if the determining module receives AG change indication information sent by the MME, send a packet data network PDN connection establishment request message to the MME; and after receiving a PDN connection establishment response message that is sent, according to the PDN connection establishment request message, by the MME, determine that the UE needs to be handed over from the first access gateway AG to the second access gateway AG.

With reference to the second aspect, or any possible implementation manner of the first to the fourth possible implementation manners of the second aspect, in a fifth possible implementation manner, the notification module is specifically configured to:

after the determining module determines that the UE needs to be handed over from the first AG to the second AG, and before the notification module notifies the service peer end that the IP address of the UE is changed from the first IP address to the second IP address, send, to the first AG through the second AG, a binding update message for binding the second IP address and the first IP address, where the binding update message is used to instruct the first AG to forward, to the second AG, received downlink data that needs to be sent to the UE.

With reference to the second aspect, or any possible implementation manner of the first to the fifth possible implementation manners of the second aspect, in a sixth possible implementation manner, the notification module is specifically configured to:

after notifying the service peer end that the IP address of the UE is changed from the first IP address to the second IP address, send a service path change notification message to the mobility management entity MME, so that the MME instructs the first AG to release a session between the first AG and the UE.

According to a third aspect, a service path changing apparatus is provided, including:

a determining module, configured to determine that a user equipment UE needs to be handed over from a first access gateway AG to a second AG that assigns a second Internet Protocol IP address to the UE; and a transceiver module, configured to forward, to the second AG according to a result determined by the determining module, downlink data that needs to be sent to the UE.

With reference to the third aspect, in a first possible implementation manner, the determining module is specifically configured to:

after the transceiver module receives a forwarding path creation request message sent by a mobility management entity MME, determine that the UE needs to be handed over from the first AG to the second AG, where the forwarding path creation request message includes forwarding path destination end information; or after the transceiver module receives a binding update message sent by the second AG, where the binding update message is for binding the second IP address and a first IP address that is assigned to the UE by the first AG, determine that the UE needs to be handed over from the first AG to the second AG.

With reference to the first possible implementation manner of the third aspect, in a second possible implementation manner, the transceiver module is further configured to: after receiving the forwarding path creation request message sent by the MME, and before forwarding, to the second AG, the downlink data that needs to be sent to the UE, send the forwarding path start end information to the second AG through the MME.

With reference to the third aspect, or the first or the second possible implementation manner of the third aspect, in a third possible implementation manner, the determining module is further configured to: after the transceiver module forwards, to the second AG, the downlink data that needs to be sent to the UE, if it is determined that the transceiver module receives instruction information that is for releasing a session between the first AG and the UE and sent by the MME, release the session between the first AG and the UE.

According to a fourth aspect, a service path changing apparatus is provided, including:

a determining module, configured to determine that a user equipment UE needs to access a second AG, where an AG that is last accessed by the UE is a first AG; and a transceiver module, configured to assign, to the UE according to a result determined by the determining module, a second IP address and bearer information that is used to perform service transmission between the second AG and the UE, so that the UE notifies, according to the bearer information, a service peer end that an IP address of the UE is changed from a first IP address assigned by the first AG to the second IP address assigned by the second AG.

With reference to the fourth aspect, in a first possible implementation manner, the determining module is specifically configured to: after the transceiver module receives a session creation request message sent by a mobility management entity MME, determine that the UE needs to access the second AG; and the transceiver module is specifically configured to send a session creation response message to the MME, where the session creation response message includes the bearer information and the second IP address; or send a session creation response message to the MME, where the session creation response message includes the bearer information; and after the second AG receives information for requesting to acquire an IP address and sent by the UE according to the bearer information, the second AG assigns the second IP address to the UE.

With reference to the first possible implementation manner of the fourth aspect, in a second possible implementation manner, the session creation request message includes indication information indicating that an AG previously accessed by the UE is not the second AG, and the session creation response message further includes forwarding path destination end information; and the transceiver module is further configured to: after sending the session creation response message to the MME, receive forwarding path start end information sent by the MME; and receive, according to the forwarding path start end information, downlink data that needs to be sent to the UE and is forwarded by the first AG, and send the received downlink data to the UE.

With reference to the first possible implementation manner of the fourth aspect, in a third possible implementation manner, the session creation request message includes the first IP address of the UE; and the transceiver module is further configured to: after receiving the session creation request message sent by the MME and sending the session creation response message to the MME, send, to the first AG according to the first IP address, a binding update message for binding the second IP address and the first IP address, where the binding update message is used to instruct the first AG to forward, to the second AG, received downlink data that needs to be sent to the UE.

According to a fifth aspect, a service path changing apparatus is provided, including:

a processor, configured to determine that a user equipment UE needs to be handed over from a first access gateway AG to a second AG; and a transceiver, configured to instruct, according to a result determined by the processor, the UE to notify, according to bearer information used to perform service transmission between the second AG and the UE and assigned by the second AG, a service peer end that an Internet Protocol IP address of the UE is changed from a first IP address assigned by the first AG to a second IP address assigned by the second AG.

With reference to the fifth aspect, in a first possible implementation manner, the processor is specifically configured to:

after the transceiver receives a tracking area update TAU request message sent by the UE, determine that the UE needs to be handed over from the first AG to the second AG; or after the transceiver receives a service request message used to request a service and sent by the UE, determine that the UE needs to be handed over from the first AG to the second AG.

With reference to the fifth aspect, or the first possible implementation manner of the fifth aspect, in a second possible implementation manner, the transceiver is further configured to:

after the processor determines that the UE needs to be handed over from the first AG to the second AG, and before the transceiver instructs the UE to notify the service peer end that the IP address of the UE is changed from the first IP address to the second IP address, send, to the second AG, a session creation request message that is for the UE and used to request to establish a session connection between the second AG and the UE, and receive a session creation response message sent by the second AG, where the session creation response message includes the bearer information and the second IP address that are assigned by the second AG; or the session creation response message includes the bearer information assigned by the second AG.

With reference to the second possible implementation manner of the fifth aspect, in a third possible implementation manner, if the session creation response message includes the bearer information and the second IP address, the transceiver is specifically configured to send the bearer information and the second IP address to the UE, and instruct the UE to notify, according to the bearer information, the service peer end of the second IP address and the first IP address that is assigned by the first AG; or if the session creation response message includes the bearer information, the transceiver is specifically configured to send the bearer information to the UE, and instruct the UE to request, according to the bearer information, to acquire the second IP address from the second AG, and to notify the service peer end of the second IP address and the first IP address that is assigned by the first AG.

With reference to the second or the third possible implementation manner of the fifth aspect, in a fourth possible implementation manner, the transceiver is specifically configured to: send AG change indication information to the UE; and after receiving a packet data network PDN connection establishment request message that is sent, according to the AG change indication information, by the UE, send the session creation request message to the second AG.

With reference to the second, the third, or the fourth possible implementation manner of the fifth aspect, in a fifth possible implementation manner, the session creation request message includes indication information used to indicate that an AG last accessed by the UE before the UE accesses the second AG is not the second AG, and the session creation response message further includes forwarding path destination end information; and the transceiver is further configured to: after receiving the session creation response message sent by the second AG, and before instructing the UE to notify the service peer end that the IP address of the UE is changed from the first IP address to the second IP address, send a forwarding path creation request message including the forwarding path destination end information to the first AG, and receive forwarding path start end information sent by the first AG, where the forwarding path creation request message is used to instruct the first AG to forward, to the second AG, received downlink data that needs to be sent to the UE; and send the received forwarding path start end information to the second AG.

With reference to the second, the third, or the fourth possible implementation manner of the fifth aspect, in a sixth possible implementation manner, the session creation request message includes the first IP address of the UE, where the first IP address is used to instruct the second AG to send, to the first AG, a binding update message for binding the second IP address and the first IP address, where the binding update message is used to instruct the first AG to forward, to the second AG, received downlink data that needs to be sent to the UE.

With reference to the fifth aspect, or any possible implementation manner of the first to the sixth possible implementation manners of the fifth aspect, in a seventh possible implementation manner, the transceiver is further configured to: after the transceiver instructs the UE to notify the service peer end that the IP address of the UE is changed from the first IP address to the second IP address, if the transceiver receives a service path change notification message sent by the UE, instruct the first AG to release a session between the first AG and the UE.

According to a sixth aspect, a service path changing apparatus is provided, including:

a processor, configured to determine that a user equipment UE needs to be handed over from a first access gateway AG to a second AG; and a transceiver, configured to notify, according to a result determined by the processor, a service peer end that an Internet Protocol IP address of the UE is changed from a first IP address assigned by the first AG to a second IP address assigned by the second AG.

With reference to the sixth aspect, in a first possible implementation manner, the processor is specifically configured to: after the transceiver receives bearer information used to perform service transmission between the second AG and the UE and the second IP address that are assigned by the second AG and sent by a mobility management entity MME, determine that the UE needs to be handed over from the first AG to the second AG; and the transceiver is specifically configured to notify, according to the bearer information, the service peer end of the second IP address assigned by the second AG and the first IP address assigned by the first AG.

With reference to the sixth aspect, in a second possible implementation manner, the processor is specifically configured to: after the transceiver receives bearer information used to perform service transmission between the second AG and the UE, assigned by the second AG, and sent by a mobility management entity MME, determine that the UE needs to be handed over from the first AG to the second AG; and the transceiver is specifically configured to request, according to the bearer information, to acquire the second IP address from the second AG, and notify the service peer end of the acquired second IP address and the first IP address that is assigned by the first AG.

With reference to the sixth aspect, or the first or the second possible implementation manner of the sixth aspect, in a third possible implementation manner, the transceiver is specifically configured to send a tracking area update TAU request message to the mobility management entity MME, and receive TAU accept information sent by the MME; and the processor is specifically configured to determine, according to the TAU accept information received by the transceiver, that the UE needs to be handed over from the first access gateway AG to the second AG; or the transceiver is specifically configured to send a service request message to the MME, and receive a radio bearer establishment response message sent by the MME; and the processor is specifically configured to determine, according to the radio bearer establishment response message received by the transceiver, that the UE needs to be handed over from the first AG to the second AG.

With reference to the sixth aspect, or the first or the second possible implementation manner of the sixth aspect, in a fourth possible implementation manner, the transceiver is specifically configured to: after the transceiver sends a tracking area update TAU request message or a service request message to the mobility management entity MME, if the transceiver receives AG change indication information sent by the MME, send a packet data network PDN connection establishment request message to the MME; and the processor is specifically configured to: after the transceiver receives a PDN connection establishment response message that is sent, according to the PDN connection establishment request message, by the MME, determine that the UE needs to be handed over from the first AG to the second AG.

With reference to the sixth aspect, or any possible implementation manner of the first to the fourth possible implementation manners of the sixth aspect, in a fifth possible implementation manner, the transceiver is further configured to: after the processor determines that the UE needs to be handed over from the first AG to the second AG, and before the transceiver notifies the service peer end that the IP address of the UE is changed from the first IP address to the second IP address, send, to the first AG through the second AG, a binding update message for binding the second IP address and the first IP address, where the binding update message is used to instruct the first AG to forward, to the second AG, received downlink data that needs to be sent to the UE.

With reference to the sixth aspect, or any possible implementation manner of the first to the fifth possible implementation manners of the sixth aspect, in a sixth possible implementation manner, the transceiver is further configured to: after notifying the service peer end that the IP address of the UE is changed from the first IP address to the second IP address, send a service path change notification message to the mobility management entity MME, so that the MME instructs the first AG to release a session between the first AG and the UE.

According to a seventh aspect, a service path changing apparatus is provided, including:

a processor, configured to determine that a user equipment UE needs to be handed over from a first access gateway AG to a second AG that assigns a second Internet Protocol IP address to the UE; and a transceiver, configured to forward, to the second AG according to a result determined by the processor, downlink data that needs to be sent to the UE.

With reference to the seventh aspect, in a first possible implementation manner, the processor is specifically configured to:

after the transceiver receives a forwarding path creation request message sent by a mobility management entity MME, determine that the UE needs to be handed over from the first AG to the second AG that assigns the second IP address to the UE, where the forwarding path creation request message includes forwarding path destination end information; or after the transceiver receives a binding update message sent by the second AG, where the binding update message is for binding the second IP address and a first IP address that is assigned to the UE by the first AG, determine that the UE needs to be handed over from the first AG to the second AG that assigns the second IP address to the UE.

With reference to the first possible implementation manner of the seventh aspect, in a second possible implementation manner, the transceiver is further configured to: after receiving the forwarding path creation request message sent by the MME, and before forwarding, to the second AG, the downlink data that needs to be sent to the UE, send the forwarding path start end information to the second AG through the MME.

With reference to the seventh aspect, or the first or the second possible implementation manner of the seventh aspect, in a third possible implementation manner, the processor is further configured to: after the transceiver forwards, to the second AG, the downlink data that needs to be sent to the UE, if the transceiver receives instruction information that is for releasing a session between the first AG and the UE and sent by the mobility management entity MME, release the session between the first AG and the UE.

According to an eighth aspect, a service path changing apparatus is provided, including:

a processor, configured to determine that a user equipment UE needs to access a second AG, where an access gateway AG that is last accessed by the UE is a first AG; and a transceiver, configured to assign, to the UE according to a result determined by the processor, a second Internet Protocol IP address and bearer information that is used to perform service transmission between the second AG and the UE, so that the UE notifies, according to the bearer information, a service peer end that an IP address of the UE is changed from a first IP address assigned by the first AG to the second IP address assigned by the second AG.

With reference to the eighth aspect, in a first possible implementation manner, the processor is specifically configured to:

receive a session creation request message sent by a mobility management entity MME, and send a session creation response message to the MME, where the session creation response message includes the bearer information and the second IP address; or receive a session creation request message sent by a mobility management entity MME, and send a session creation response message to the MME, where the session creation response message includes the bearer information; and after the second AG receives information for requesting to acquire an IP address and sent by the UE according to the bearer information, the second AG assigns the second IP address to the UE.

With reference to the first possible implementation manner of the eighth aspect, in a second possible implementation manner, the session creation request message includes indication information indicating that an AG previously accessed by the UE is not the second AG, and the session creation response message further includes forwarding path destination end information; and the transceiver is further configured to: after sending the session creation response message to the MME, receive forwarding path start end information sent by the MME; and receive, according to the forwarding path start end information, downlink data that needs to be sent to the UE and is forwarded by the first AG, and send the received downlink data to the UE.

With reference to the first possible implementation manner of the eighth aspect, in a third possible implementation manner, the session creation request message includes the first IP address of the UE; and the transceiver is further configured to: after receiving the session creation request message sent by the MME and sending the session creation response message to the MME, send, to the first AG according to the first IP address, a binding update message for binding the second IP address and the first IP address, where the binding update message is used to instruct the first AG to forward, to the second AG, received downlink data that needs to be sent to the UE.

According to a ninth aspect, a service path changing method is provided, including:

determining, by a mobility management entity MME, that a user equipment UE needs to be handed over from a first access gateway AG to a second access gateway AG; and instructing, by the MME, the UE to notify, according to bearer information used to perform service transmission between the second AG and the UE and assigned by the second AG, a service peer end that an IP address of the UE is changed from a first IP address assigned by the first AG to a second IP address assigned by the second AG.

With reference to the ninth aspect, in a first possible implementation manner, the determining, by an MME, that a UE needs to be handed over from a first AG to a second AG includes:

after receiving a tracking area update TAU request message sent by the UE, determining, by the MME, that the UE needs to be handed over from the first AG to the second AG; or after receiving a service request message used to request a service and sent by the UE, determining, by the MME, that the UE needs to be handed over from the first AG to the second AG.

With reference to the ninth aspect, or the first possible implementation manner of the ninth aspect, in a second possible implementation manner, after the determining, by an MME, that a UE needs to be handed over from a first AG to a second AG, and before the instructing, by the MME, the UE to notify a service peer end that an IP address of the UE is changed from a first IP address to a second IP address, the method further includes:

sending, by the MME to the second AG, a session creation request message that is for the UE and used to request to establish a session connection between the second AG and the UE, and receiving a session creation response message sent by the second AG, where the session creation response message includes the bearer information and the second IP address that are assigned by the second AG; or the session creation response message includes the bearer information assigned by the second AG.

With reference to the second possible implementation manner of the ninth aspect, in a third possible implementation manner, if the session creation response message includes the bearer information and the second IP address, the instructing, by the MME, the UE to notify, according to bearer information, a service peer end that an IP address of the UE is changed from a first IP address to a second IP address includes: sending, by the MME, the bearer information and the second IP address to the UE, and instructing the UE to notify, according to the bearer information, the service peer end of the second IP address and the first IP address that is assigned by the first AG; or if the session creation response message includes the bearer information, the instructing, by the MME, the UE to notify, according to bearer information, a service peer end that an IP address of the UE is changed from a first IP address to a second IP address includes: sending, by the MME, the bearer information to the UE, and instructing the UE to request, according to the bearer information, to acquire the second IP address from the second AG, and to notify the service peer end of the second IP address and the first IP address that is assigned by the first AG.

With reference to the second or the third possible implementation manner of the ninth aspect, in a fourth possible implementation manner, the sending, by the MME to the second AG, a session creation request message includes:

sending, by the MME, AG change indication information to the UE; and after determining that a packet data network PDN connection establishment request message sent by the UE according to the AG change indication information is received, sending, by the MME, the session creation request message to the second AG.

With reference to the second, the third, or the fourth possible implementation manner of the ninth aspect, in a fifth possible implementation manner, the session creation request message includes indication information used to indicate that an AG last accessed by the UE before the UE accesses the second AG is not the second AG, and the session creation response message further includes forwarding path destination end information; and after the receiving, by the MME, a session creation response message sent by the second AG, and before the instructing, by the MME, the UE to notify a service peer end that an IP address of the UE is changed from a first IP address to a second IP address, the method further includes:

sending, by the MME, a forwarding path creation request message including the forwarding path destination end information to the first AG, and receiving forwarding path start end information sent by the first AG, where the forwarding path creation request message is used to instruct the first AG to forward, to the second AG, received downlink data that needs to be sent to the UE; and sending, by the MME, the received forwarding path start end information to the second AG.

With reference to the second, the third, or the fourth possible implementation manner of the ninth aspect, in a sixth possible implementation manner, the session creation request message includes the first IP address of the UE, where the first IP address is used to instruct the second AG to send, to the first AG, a binding update message for binding the second IP address and the first IP address, where the binding update message is used to instruct the first AG to forward, to the second AG, received downlink data that needs to be sent to the UE.

With reference to the ninth aspect, or any possible implementation manner of the first to the sixth possible implementation manners of the ninth aspect, in a seventh possible implementation manner, after the instructing, by the MME, the UE to notify a service peer end that an IP address of the UE is changed from a first IP address to a second IP address, the method further includes:

after receiving a service path change notification message sent by the UE, instructing, by the MME, the first AG to release a session between the first AG and the UE.

According to a tenth aspect, a service path changing method is provided, including:

determining, by a user equipment UE, that the UE needs to be handed over from a first access gateway AG to a second access gateway AG; and notifying, by the UE, a service peer end that an IP address of the UE is changed from a first IP address assigned by the first AG to a second IP address assigned by the second AG.

With reference to the tenth aspect, in a first possible implementation manner, the determining, by a UE, that the UE needs to be handed over from a first AG to a second AG includes: receiving, by the UE, bearer information used to perform service transmission between the second AG and the UE and the second IP address that are assigned by the second AG and sent by a mobility management entity MME; and the notifying, by the UE, a service peer end that an IP address of the UE is changed from a first IP address to a second IP address includes: notifying, by the UE according to the bearer information, the service peer end of the second IP address assigned by the second AG and the first IP address assigned by the first AG.

With reference to the tenth aspect, in a second possible implementation manner, the determining, by a UE, that the UE needs to be handed over from a first AG to a second AG includes: receiving, by the UE, bearer information used to perform service transmission between the second AG and the UE, assigned by the second AG, and sent by a mobility management entity MME; and the notifying, by the UE, a service peer end that an IP address of the UE is changed from a first IP address to a second IP address includes: requesting, by the UE according to the bearer information, to acquire the second IP address from the second AG, and notifying the service peer end of the acquired second IP address and the first IP address that is assigned by the first AG.

With reference to the tenth aspect, or the first or the second possible implementation manner of the tenth aspect, in a third possible implementation manner, the determining, by a UE, that the UE needs to be handed over from a first access gateway AG to a second access gateway AG includes:

after sending a tracking area update TAU request message to the mobility management entity MME, determining, by the UE according to TAU accept information sent by the MME, that the UE needs to be handed over from the first access gateway AG to the second access gateway AG; or after sending a service request message to the MME, determining, by the UE according to a radio bearer establishment response message sent by the MME, that the UE needs to be handed over from the first access gateway AG to the second access gateway AG.

With reference to the tenth aspect, or the first or the second possible implementation manner of the tenth aspect, in a fourth possible implementation manner, the determining, by a UE, that the UE needs to be handed over from a first AG to a second AG includes:

after the UE sends a tracking area update TAU request message or a service request message to the mobility management entity MME, if the UE receives AG change indication information sent by the MME, sending, by the UE, a packet data network PDN connection establishment request message to the MME; and after receiving a PDN connection establishment response message that is sent, according to the PDN connection establishment request message, by the MME, determining, by the UE, that the UE needs to be handed over from the first access gateway AG to the second access gateway AG.

With reference to the tenth aspect, or any possible implementation manner of the first to the fourth possible implementation manners of the tenth aspect, in a fifth possible implementation manner, after the determining, by a UE, that the UE needs to be handed over from a first AG to a second AG, and before the notifying, by the UE, a service peer end that an IP address of the UE is changed from a first IP address to a second IP address, the method further includes:

sending, by the UE to the first AG through the second AG, a binding update message for binding the second IP address and the first IP address, where the binding update message is used to instruct the first AG to forward, to the second AG, received downlink data that needs to be sent to the UE.

With reference to the tenth aspect, or any possible implementation manner of the first to the fifth possible implementation manners of the tenth aspect, in a sixth possible implementation manner, after the notifying, by the UE, a service peer end that an IP address of the UE is changed from a first IP address to a second IP address, the method further includes:

sending, by the UE, a service path change notification message to the MME, so that the MME instructs the first AG to release a session between the first AG and the UE.

According to an eleventh aspect, a service path changing method is provided, including:

determining, by a first access gateway AG, that a user equipment UE needs to be handed over to a second AG that assigns a second IP address to the UE; and forwarding, by the first AG to the second AG, downlink data that needs to be sent to the UE.

With reference to the eleventh aspect, in a first possible implementation manner, the determining, by a first AG, that a UE needs to be handed over to a second AG includes:

receiving, by the first AG, a forwarding path creation request message sent by a mobility management entity MME, where the forwarding path creation request message includes forwarding path destination end information; or receiving, by the first AG, a binding update message sent by the second AG, where the binding update message is for binding the second IP address and a first IP address that is assigned to the UE by the first AG.

With reference to the first possible implementation manner of the eleventh aspect, in a second possible implementation manner, after the receiving, by the first AG, a forwarding path creation request message sent by an MME, and before the forwarding, by the first AG to the second AG, downlink data that needs to be sent to the UE, the method further includes:

sending, by the first AG through the MME, the forwarding path start end information to the second AG.

With reference to the eleventh aspect, or the first or the second possible implementation manner of the eleventh aspect, in a third possible implementation manner, after the forwarding, by the first AG to the second AG, downlink data that needs to be sent to the UE, the method further includes:

after receiving instruction information that is for releasing a session between the first AG and the UE and sent by the mobility management entity MME, releasing, by the first AG, the session between the first AG and the UE.

According to a twelfth aspect, a service path changing method is provided, including:

determining, by a second access gateway AG, that a user equipment UE needs to access the second AG, where an AG that is last accessed by the UE is a first AG; and assigning, by the second AG to the UE, a second IP address and bearer information that is used to perform service transmission between the second AG and the UE, so that the UE notifies, according to the bearer information, a service peer end that an IP address of the UE is changed from a first IP address assigned by the first AG to the second IP address assigned by the second AG.

With reference to the twelfth aspect, in a first possible implementation manner, the determining, by a second AG, that a user equipment UE needs to access the second AG, where an AG that is last accessed by the UE is a first AG includes: receiving, by the second AG, a session creation request message sent by a mobility management entity MME;

the assigning, by the second AG to the UE, a second IP address and bearer information includes:

sending, by the second AG according to the session creation request message, a session creation response message to the MME, where the session creation response message includes the bearer information and the second IP address; or sending, by the second AG according to the session creation request message, a session creation response message to the MME, where the session creation response message includes the bearer information; and after the second AG receives information for requesting to acquire an IP address and sent by the UE according to the bearer information, assigning, by the second AG, the second IP address to the UE.

With reference to the first possible implementation manner of the twelfth aspect, in a second possible implementation manner, the session creation request message includes indication information indicating that an AG previously accessed by the UE is not the second AG, and the session creation response message further includes forwarding path destination end information; and after the sending, by the second AG, a session creation response message to the MME, the method further includes:

receiving, by the second AG, forwarding path start end information sent by the MME; and receiving, by the second AG according to the forwarding path start end information, downlink data that needs to be sent to the UE and is forwarded by the first AG, and sending the received downlink data to the UE.

With reference to the first possible implementation manner of the twelfth aspect, in a third possible implementation manner, the session creation request message includes the first IP address of the UE; and after the receiving, by the second AG, a session creation request message sent by an MME and the sending, by the second AG, a session creation response message to the MME, the method further includes:

sending, by the second AG to the first AG according to the first IP address, a binding update message for binding the second IP address and the first IP address, where the binding update message is used to instruct the first AG to forward, to the second AG, received downlink data that needs to be sent to the UE.

By using the method or the apparatus provided in any one of the foregoing aspects, according to an instruction of an MME, a UE may be handed over from a first AG to a second AG, and notify a service peer end of a second IP address assigned by the second AG, and the service peer end may communicate with the UE by using the second IP address assigned by the second AG to the UE. Because the second IP address assigned by the second AG exists in an IP address segment maintained by the second AG, it is not required to add a first IP address assigned to the UE by the first AG into the IP address segment maintained by the second AG, that is, it is unnecessary to change routing information of a router in a PDN to route downlink data of the UE to the second AG.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure. In a case in which no contradiction occurs, the following embodiments may be cross-referred to each other.

Figure 1:
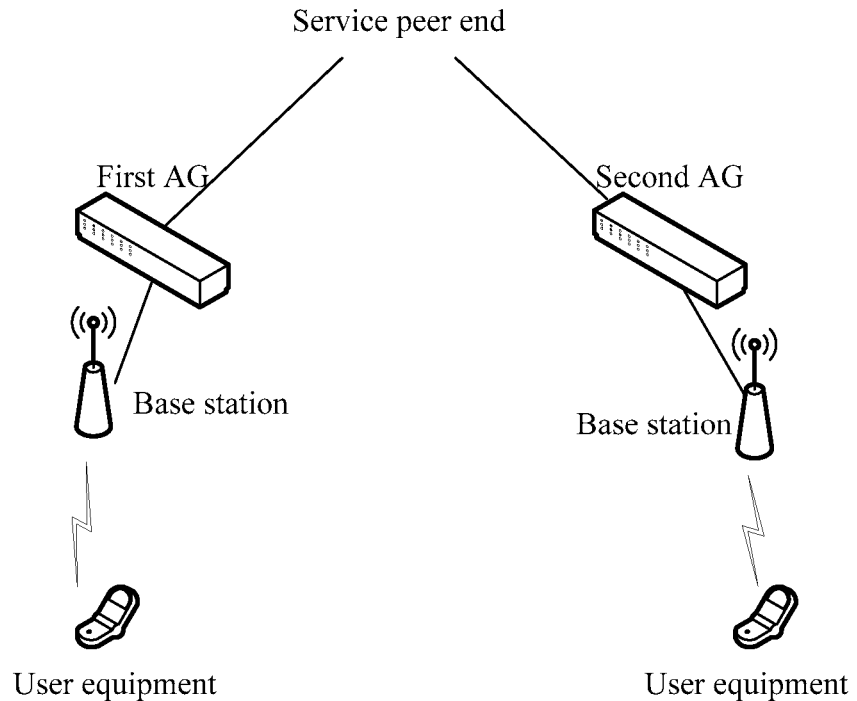
FIG. 1 is a schematic diagram of a network architecture applied to an embodiment of the present disclosure.

The embodiments of the present disclosure mainly relate to a process of changing a service path between a UE and a service peer end when the UE moves from coverage of one AG to coverage of another AG; each AG herein is a physical device obtained by combining an S-GW and a P-GW. As shown in FIG. 1, FIG. 1 is a schematic diagram of a network architecture applied to an embodiment of the present disclosure. In the figure, according to an instruction of an MME, a UE is handed over from a first AG to a second AG, and notifies a service peer end of a second Internet Protocol (IP) address assigned by the second AG, and the service peer end may communicate with the UE by using the second IP address assigned by the second AG to the UE. Because the second IP address assigned by the second AG exists in an IP address segment maintained by the second AG, it is not required to add a first IP address assigned to the UE by the first AG into the IP address segment maintained by the second AG, that is, it is unnecessary to change routing information of a router in a PDN to route downlink data of the UE to the second AG.

Figure 2:
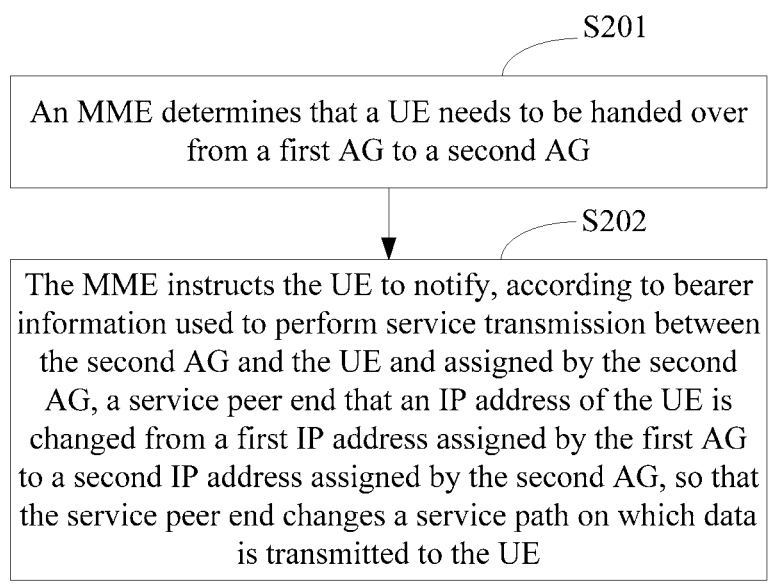
FIG. 2 is a flowchart of a service path changing method according to Embodiment 1 of the present disclosure.

As shown in FIG. 2, FIG. 2 is a flowchart of a service path changing method according to Embodiment 1 of the present disclosure, where the service path changing method includes the following steps.

S201: An MME determines that a UE needs to be handed over from a first AG to a second AG.

S202: The MME instructs the UE to notify, according to bearer information used to perform service transmission between the second AG and the UE and assigned by the second AG, a service peer end that an IP address of the UE is changed from a first IP address assigned by the first AG to a second IP address assigned by the second AG, so that the service peer end changes a service path on which data is transmitted to the UE.

The service peer end in step S202 may be a service server, a service terminal, or the like, where the service server may provide Internet services, such as audio, video, chatting, forum, email, web page browsing, or game services, for the UE, and the service terminal may perform point-to-point service communication, such as voice call, video call, and game, with the UE.

In this embodiment of the present disclosure, after being handed over from a first AG to a second AG, a UE uses an IP address assigned by the second AG that is newly accessed, and notifies a service peer end that an IP address of the UE is changed from a first IP address assigned by the first AG to a second IP address assigned by the second AG, so that the service peer end changes a service path on which data is transmitted to the UE. Because the second IP address assigned by the second AG exists in an IP address segment maintained by the second AG, it is not required to add the first IP address assigned to the UE by the first AG into the IP address segment maintained by the second AG, that is, it is unnecessary to change routing information of a router in a PDN to route downlink data of the UE to the second AG, thereby preventing fragmentation of routing table information in the router, reducing time for route search, and improving forwarding efficiency.

Optionally, in step S201, the MME may specifically determine, after receiving a tracking area update (TAU) request message sent by the UE, that the UE needs to perform AG handover; or may determine, after receiving a service request message sent by the UE and when selecting an AG to be accessed by the UE, that the UE needs to perform AG handover. That is, step S201 specifically includes:

after receiving a tracking area update TAU request message sent by the UE, the MME determines that the UE needs to be handed over from the first AG to the second AG; or after receiving a service request message used to request a service and sent by the UE, the MME determines that the UE needs to be handed over from the first AG to the second AG.

Herein, if the MME receives the TAU request message sent by the UE, it indicates that a TAU change occurs on the UE, which also means that the UE has left original coverage of the first AG; in this case, the MME determines that an AG newly accessed by the UE may be the second AG. If the MME receives the service request message sent by the UE, whether the UE still exists in coverage of the first AG that is last accessed is determined first, and if it is determined that the UE has left the coverage of the first AG, the second AG that is newly accessed is selected for the UE.

Optionally, after step S201 and before step S202, the following is further included:

The MME sends, to the second AG, a session creation request message that is for the UE and used to request to establish a session connection between the second AG and the UE, and receives a session creation response message sent by the second AG, where the session creation response message includes the bearer information and the second IP address that are assigned by the second AG; or the session creation response message includes the bearer information assigned by the second AG to the UE.

Correspondingly, if the session creation response message includes the bearer information and the second IP address, that the MME instructs the UE to notify, according to bearer information, a service peer end that an IP address of the UE is changed from a first IP address to a second IP address includes: the MME sends the bearer information and the second IP address to the UE, so that the UE notifies, according to the bearer information, the service peer end of the second IP address and the first IP address that is assigned by the first AG.

If the session creation response message includes the bearer information, that the MME instructs the UE to notify, according to bearer information, a service peer end that an IP address of the UE is changed from a first IP address to a second IP address includes: the MME sends the bearer information to the UE, so that the UE requests, according to the bearer information, to acquire the second IP address from the second AG, and notifies the service peer end of the second IP address and the first IP address that is assigned by the first AG.

In a specific implementation process, after step S201, the MME may acquire the bearer information used to perform communication between the UE and the second AG and the second IP address of the UE that are assigned to the UE by the second AG newly accessed by the UE, and send the bearer information and the second IP address to the UE; the UE notifies, according to the bearer information, the service peer end that the IP address of the UE is changed from the first IP address to the second IP address. Alternatively, the MME may acquire only the bearer information that is assigned to the UE by the second AG newly accessed by the UE, and send the bearer information to the UE; the UE may request, according to the bearer information, to acquire the second IP address from the second AG. The bearer information herein is information used to indicate a bearer resource that bears information about service transmission between the UE and the second AG, and generally includes default bearer information and dedicated bearer information, where a default bearer is also referred to as a bearer by default, and it is a user bearer that meets default quality of service (QoS); and a dedicated bearer is established to meet a specific QoS transmission demand, and a QoS requirement of the dedicated bearer is different from a QoS requirement of the default bearer.

In specific implementation, if the UE sends the TAU request message, the MME sends a TAU accept message to the UE, where the TAU accept message includes the foregoing bearer information or the bearer information and the second IP address; if the UE sends the service request message, the MME sends the foregoing bearer information or the bearer information and the second IP address to the UE by means of a radio bearer establishment process.

Optionally, after step S201, that the MME sends, to the second AG, a session creation request message specifically includes:

the MME sends AG change indication information to the UE; and after determining that a packet data network PDN connection establishment request message sent by the UE according to the AG change indication information is received, the MME sends the session creation request message to the second AG.

In a specific implementation process, the MME may immediately send, after determining that the UE needs to be handed over from the first AG to the second AG, the session creation request message to the second AG, and request to acquire the bearer information for communication between the UE and the second AG, or the like, or may first send, after determining that the UE needs to be handed over from the first AG to the second AG, the AG change indication information to the UE, wait for a further instruction of the UE, and send the session creation request message to the second AG after receiving the PDN connection establishment request message sent by the UE.

In a specific implementation process, when AG handover is performed, in order not to interrupt a service of the UE, a forwarding path may be created, and downlink data sent by the service peer end to the UE is forwarded by the first AG to the second AG. Two manners of creating a forwarding path are described in this embodiment of the present disclosure.

In a first manner, forwarding path information is carried in the session creation request message and the session creation response message.

Specifically, the session creation request message includes indication information used to indicate that an AG last accessed by the UE before the UE accesses the second AG is not the second AG, and the session creation response message further includes forwarding path destination end information.

After the MME receives the session creation response message sent by the second AG, and before the MME instructs the UE to notify the service peer end that the IP address of the UE is changed from the first IP address to the second IP address, the following is further included: the MME sends a forwarding path creation request message including the forwarding path destination end information to the first AG, and receives forwarding path start end information sent by the first AG, where the forwarding path creation request message is used to instruct the first AG to forward, to the second AG, received downlink data that needs to be sent to the UE; and the MME sends the received forwarding path start end information to the second AG.

In the foregoing step, the forwarding path destination end information is information about the second AG receiving the forwarded data, includes an IP address of a tunnel endpoint of the second AG, and may further include a port number of the second AG, a tunnel endpoint identifier (TED) of the second AG, a Generic Routing Encapsulation key (GRE) assigned to the second AG, and the like. Correspondingly, the forwarding path start end information is information about the first AG sending the forwarded data, includes an IP address of a tunnel endpoint of the first AG, and may further include a port number of the first AG, a tunnel endpoint identifier (TEID) of the first AG, an assigned Generic Routing Encapsulation key (GRE), and the like.

In a second manner, the second IP address and the first IP address are bound by means of a binding update process, so as to implement data forwarding.

In this manner, the binding update process may be initiated by the second AG to the first AG, or may be initiated by the UE to the first AG by using the second AG. A specific process is as follows:

When the binding update process is initiated by the second AG, the session creation request message sent by the MME to the second AG includes the first IP address of the UE, where the first IP address is used to instruct the second AG to send, to the first AG, a binding update message for binding the second IP address and the first IP address, where the binding update message is used to instruct the first AG to forward, to the second AG, received downlink data that needs to be sent to the UE.

When the binding update process is initiated by the UE, before notifying the service peer end that the IP address of the UE is changed from the first IP address to the second IP address, the UE sends, to the first AG through the second AG, a binding update message for binding the second IP address and the first IP address. Similarly, the binding update message is used to instruct the first AG to forward, to the second AG, received downlink data that needs to be sent to the UE.

Optionally, after the MME instructs the UE to notify the service peer end that the IP address of the UE is changed from the first IP address to the second IP address, the following is further included:

after receiving a service path change notification message sent by the UE, the MME instructs the first AG to release a session between the first AG and the UE.

In a specific implementation process, after service data path transition is complete, the UE may send a service path change notification message to the MME. Specifically, if the UE sends the TAU request message to the MME at the beginning, the UE may send the service path change notification message to the MME by adding the service path change notification message into a TAU complete message; after receiving the service path change notification message, the MME may instruct the first AG to release the session between the first AG and the UE, which specifically includes releasing a bearer resource of the session and releasing the forwarding path, the first IP address of the UE, and the like; the MME may further instruct the second AG to release the forwarding path.

Based on a same conception, the following embodiment of the present disclosure provides a service path changing method that is based on a UE side, and repeated descriptions about specific implementation in the foregoing content are not repeatedly described.

Figure 3:
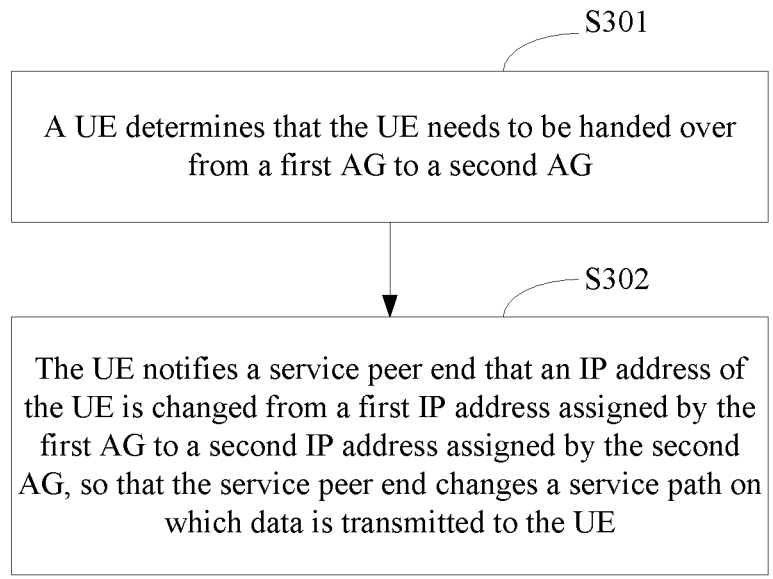
FIG. 3 is a flowchart of a service path changing method according to Embodiment 2 of the present disclosure.

As shown in FIG. 3, FIG. 3 is a flowchart of a service path changing method according to Embodiment 2 of the present disclosure, where the service path changing method includes:

S301: A UE determines that the UE needs to be handed over from a first AG to a second AG.

S302: The UE notifies a service peer end that an IP address of the UE is changed from a first IP address assigned by the first AG to a second IP address assigned by the second AG, so that the service peer end changes a service path on which data is transmitted to the UE.

In step S301, that a UE determines that the UE needs to be handed over from a first AG to a second AG includes: the UE receives bearer information used to perform service transmission between the second AG and the UE and the second IP address that are assigned by the second AG and sent by the MME; and that the UE notifies a service peer end that an IP address of the UE is changed from a first IP address to a second IP address includes: the UE notifies, according to the bearer information, the service peer end of the second IP address assigned by the second AG and the first IP address assigned by the first AG.

Alternatively, that a UE determines that the UE needs to be handed over from a first AG to a second AG includes: the UE receives bearer information used to perform service transmission between the second AG and the UE, assigned by the second AG, and sent by the MME; and that the UE notifies a service peer end that an IP address of the UE is changed from a first IP address to a second IP address includes: the UE requests, according to the bearer information, to acquire the second IP address from the second AG, and notifies the service peer end of the acquired second IP address and the first IP address that is assigned by the first AG.

In a specific implementation process, after receiving the bearer information assigned by the second AG to the UE and sent by the MME or receiving the bearer information and the second IP address that are assigned by the second AG, the UE may determine that the UE needs to be handed over from the first AG to the second AG. If the UE receives only the bearer information, the UE may further request, according to the bearer information, to acquire the second IP address from the second AG.

Optionally, that a UE determines that the UE needs to be handed over from a first access gateway AG to a second access gateway AG includes:

after sending a tracking area update TAU request message to the MME, the UE determines, according to TAU accept information sent by the MME, that the UE needs to be handed over from the first access gateway AG to the second access gateway AG; or after sending a service request message to the MME, the UE determines, according to a radio bearer establishment response message sent by the MME, that the UE needs to be handed over from the first access gateway AG to the second access gateway AG.

In a specific implementation process, after determining that the UE has moved out of effective coverage of the first AG, the UE may send the TAU request message to the MME; or when determining that the UE needs to be switched from an idle state to a working state, the UE may send the service request message to the MME.

Optionally, that a UE determines that the UE needs to be handed over from a first AG to a second AG specifically includes:

after the UE sends a tracking area update TAU request message or a service request message to the MME, if the UE receives AG change indication information sent by the MME, the UE sends a packet data network PDN connection establishment request message to the MME; and after receiving a PDN connection establishment response message that is sent, according to the PDN connection establishment request message, by the MME, the UE determines that the UE needs to be handed over from the first access gateway AG to the second access gateway AG.

In a specific implementation process, after the UE sends the TAU request message or the service request message to the MME, the MME may not immediately send new access information (including the bearer information and the second IP address that are assigned by the second AG) to the UE, but send one piece of AG change indication information, and in this case, the UE may send the PDN connection establishment request message to the MME, so as to re-establish a PDN connection to acquire the new access information. After receiving the PDN connection establishment request message, the MME sends a session creation request message to the second AG, and sends, to the UE by adding the bearer information and the second IP address that are assigned by the foregoing second AG into the PDN connection establishment response message, the bearer information and the second IP address that are assigned by the foregoing second AG.

Optionally, after the UE determines that the UE needs to be handed over from the first AG to the second AG, and before the UE notifies the service peer end that the IP address of the UE is changed from the first IP address to the second IP address, the following is further included:

the UE sends, to the first AG through the second AG, a binding update message for binding the second IP address and the first IP address, where the binding update message is used to instruct the first AG to forward, to the second AG, received downlink data that needs to be sent to the UE.

The foregoing optional implementation manner is corresponding to a forwarding path creating manner that is initiated by the UE in Embodiment 1, which is not repeatedly described herein.

Optionally, after the UE notifies the service peer end that the IP address of the UE is changed from the first IP address to the second IP address, the following is further included:

the UE sends a service path change notification message to the MME, so that the MME instructs the first AG to release a session between the first AG and the UE.

Based on a same conception, the following embodiment of the present disclosure provides a service path changing method that is based on a first AG side, and repeated descriptions about specific implementation in the foregoing content are not repeatedly described.

Figure 4:
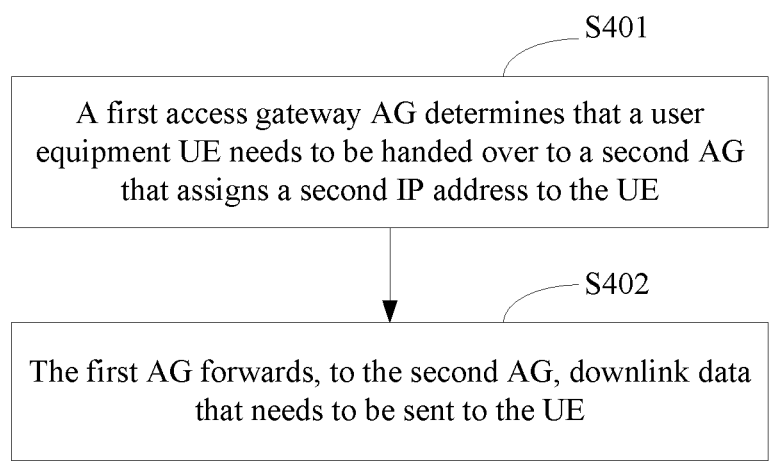
FIG. 4 is a flowchart of a service path changing method according to Embodiment 3 of the present disclosure.

As shown in FIG. 4, FIG. 4 is a flowchart of a service path changing method according to Embodiment 3 of the present disclosure, where the service path changing method includes:

S401: A first access gateway AG determines that a user equipment UE needs to be handed over to a second AG that assigns a second IP address to the UE.

S402: The first AG forwards, to the second AG, downlink data that needs to be sent to the UE.

Optionally, that a first AG determines that a UE needs to be handed over to a second AG includes:

the first AG receives a forwarding path creation request message sent by a mobility management entity MME, where the forwarding path creation request message includes forwarding path destination end information; or the first AG receives a binding update message sent by the second AG, where the binding update message is for binding the second IP address and a first IP address that is assigned to the UE by the first AG. In this case, the second AG may automatically send, according to an instruction of the MME, the banding update message to the first AG, or may forward the binding update message that is sent to the first AG by the UE.

In step S402, before the first AG forwards data, a forwarding path further needs to be created. For forwarding path creating manners, reference is specifically made to Embodiment 1, and only brief descriptions are provided herein.

In a first manner, forwarding path information is carried in a session creation request message and a session creation response message.

Corresponding to the foregoing optional step, after the first AG receives the forwarding path creation request message sent by the mobility management entity MME, and before the first AG forwards, to the second AG, the downlink data that needs to be sent to the UE, the following is further included: the first AG sends the forwarding path start end information to the second AG through the MME. That is, the first AG sends the forwarding path start end information to the MME, and the MME forwards the forwarding path start end information to the second AG.

In a second manner, the second IP address and the first IP address are bound by means of a binding update process, so as to implement data forwarding.

Corresponding to the foregoing optional step, after the first AG forwards, to the second AG, the downlink data that needs to be sent to the UE, the following is further included:

After receiving instruction information that is for releasing a session between the first AG and the UE and sent by the MME, the first AG releases the session between the first AG and the UE.

Based on a same conception, the following embodiment of the present disclosure provides a service path changing method that is based on a second AG side, and repeated descriptions about specific implementation in the foregoing content are not repeatedly described.

Figure 5:
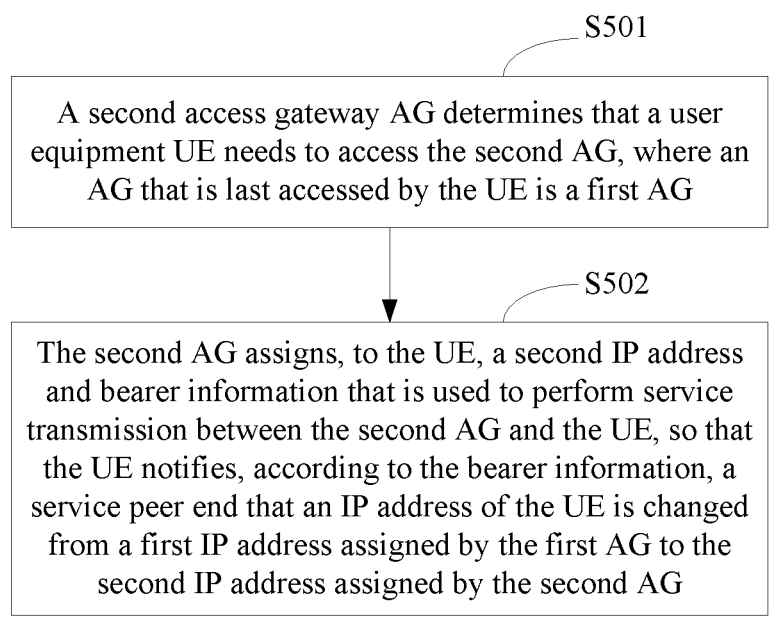
FIG. 5 is a flowchart of a service path changing method according to Embodiment 4 of the present disclosure.

As shown in FIG. 5, FIG. 5 is a flowchart of a service path changing method according to Embodiment 4 of the present disclosure, and the service path changing method includes:

S501: A second access gateway AG determines that a user equipment UE needs to access the second AG, where an AG that is last accessed by the UE is a first AG.

S502: The second AG assigns, to the UE, a second IP address and bearer information that is used to perform service transmission between the second AG and the UE, so that the UE notifies, according to the bearer information, a service peer end that an IP address of the UE is changed from a first IP address assigned by the first AG to the second IP address assigned by the second AG.

Optionally, that the second AG assigns, to the UE, a second IP address and bearer information includes:

the second AG receives a session creation request message sent by a mobility management entity MME, and sends a session creation response message to the MME, where the session creation response message includes the bearer information and the second IP address; or the second AG receives a session creation request message sent by a mobility management entity MME, and sends a session creation response message to the MME, where the session creation response message includes the bearer information; and after the second AG receives information for requesting to acquire an IP address and sent by the UE according to the bearer information, the second AG assigns the second IP address to the UE.

In a specific implementation process, when AG handover is performed, in order not to interrupt a service of the UE, a forwarding path further needs to be created, and downlink data sent by the service peer end to the UE is forwarded by the first AG to the second AG. The following two manners of creating a forwarding path are corresponding to Embodiment 1, which are not repeatedly described herein.

In a first manner, forwarding path information is carried in the session creation request message and the session creation response message.

Corresponding to the foregoing optional step, the session creation request message includes indication information indicating that an AG previously accessed by the UE is not the second AG, and the session creation response message further includes forwarding path destination end information; and after the second AG sends the session creation response message to the MME, the following is further included: the second AG receives forwarding path start end information sent by the MME; and the second AG receives, according to the forwarding path start end information, downlink data that needs to be sent to the UE and is forwarded by the first AG, and sends the received downlink data to the UE.

In a second manner, the second IP address and the first IP address are bound by means of a binding update process, so as to implement data forwarding.

Corresponding to the foregoing optional step, the session creation request message includes the first IP address of the UE; and after the second AG receives the session creation request message sent by the MME and sends the session creation response message to the MME, the following is further included: the second AG sends, to the first AG according to the first IP address, a binding update message for binding the second IP address and the first IP address, where the binding update message is used to instruct the first AG to forward, to the second AG, received downlink data that needs to be sent to the UE.

To better describe a process of the foregoing service path changing method, the following further describes the present disclosure in detail by using several specific embodiments.

Figure 6:
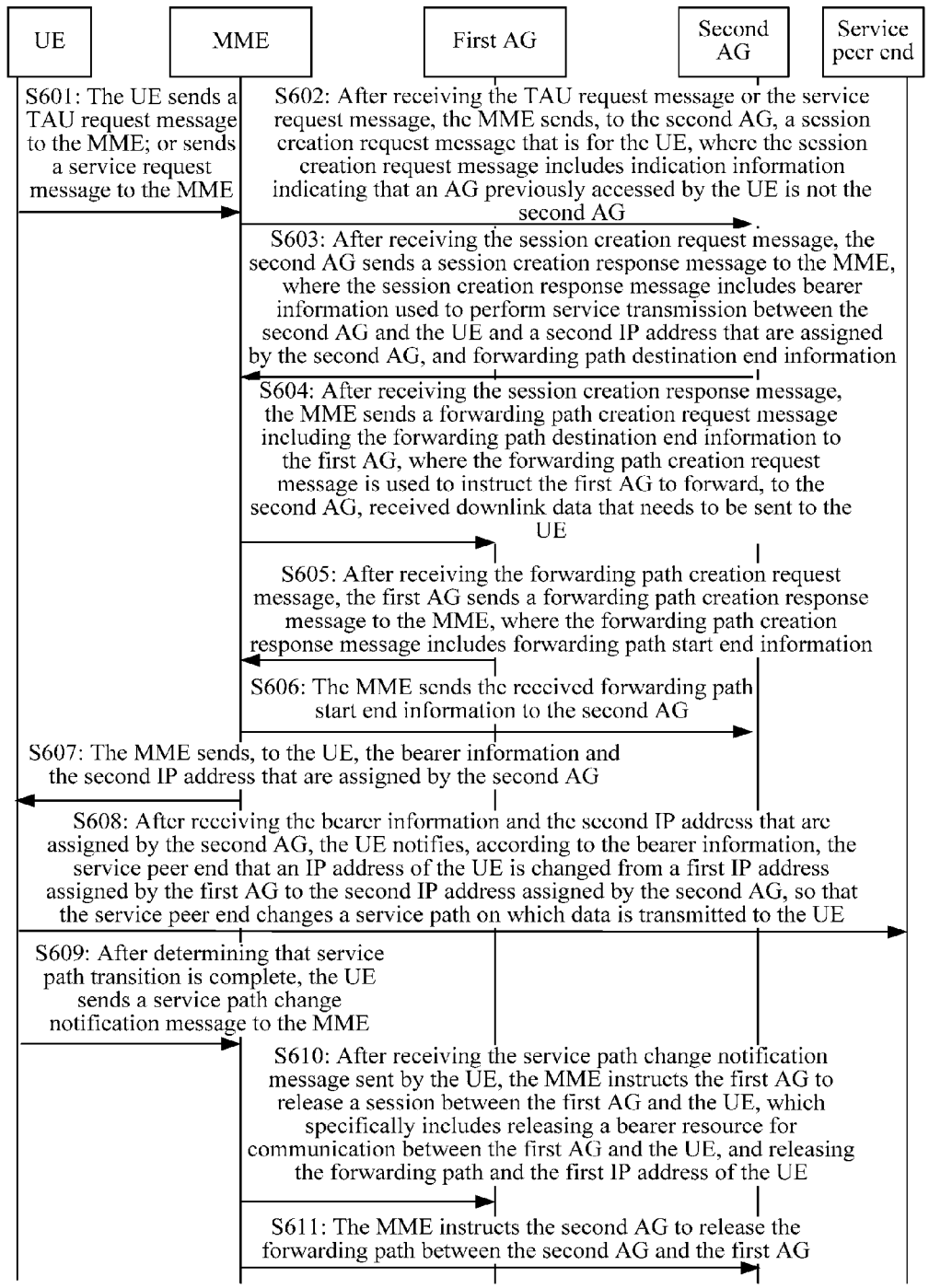
FIG. 6 is a flowchart of a service path changing method according to Embodiment 5 of the present disclosure.

As shown in FIG. 6, FIG. 6 is a flowchart of a service path changing method according to Embodiment 5 of the present disclosure. In this embodiment, an MME initiates session establishment, and the MME initiates to establish a forwarding path between a first AG previously accessed by a UE and a second AG accessed by the UE afterward. The service path changing method includes:

S601: The UE sends a TAU request message to the MME; or sends a service request message to the MME.

S602: After receiving the TAU request message or the service request message, the MME sends, to the second AG, a session creation request message that is for the UE, where the session creation request message includes indication information indicating that an AG previously accessed by the UE is not the second AG.

In this step, if an MME serving the UE changes in a moving process of the UE, an MME newly accessed by the UE may acquire, from an MME previously accessed by the UE, context information of the UE, determine that the UE is handed over from the first AG to the second AG, and send a session creation request message to the second AG.

In step S601, if the UE sends the TAU request message, the MME newly accessed by the UE may determine, according to a tracking area identity (TAI) or a globally unique temporary UE identity (GUTI) that are prior to TA updating and included in the TAU request message, the MME previously accessed by the UE.

S603: After receiving the session creation request message, the second AG sends a session creation response message to the MME, where the session creation response message includes bearer information used to perform service transmission between the second AG and the UE and a second IP address that are assigned by the second AG, and forwarding path destination end information.

The forwarding path destination end information herein includes an IP address of a tunnel endpoint of the second AG, and may further include a port number of the second AG, a tunnel endpoint identifier (TEID) of the second AG, a Generic Routing Encapsulation (GRE) key assigned to the second AG, and the like.

S604: After receiving the session creation response message, the MME sends a forwarding path creation request message including the forwarding path destination end information to the first AG, where the forwarding path creation request message is used to instruct the first AG to forward, to the second AG, received downlink data that needs to be sent to the UE.

S605: After receiving the forwarding path creation request message, the first AG sends a forwarding path creation response message to the MME, where the forwarding path creation response message includes forwarding path start end information.

The forwarding path start end information herein includes an IP address of a tunnel endpoint of the first AG, and may further include a port number of the first AG, a tunnel endpoint identifier (TEID) of the first AG, a Generic Routing Encapsulation key (GRE) assigned to the first AG, and the like.

Both the forwarding path destination end information in step S603 and the forwarding path start end information in step S605 are forwarding path information, and the forwarding path between the first AG and the second AG may be a forwarding path based on one of the following protocol forms: GPRS Tunnel Protocol (GTP), Generic Routing Encapsulation (GRE), Proxy Mobile IP (PMIP), Internet Protocol Security (IPSec), and the like.

S606: The MME sends the received forwarding path start end information to the second AG.

S607: The MME sends, to the UE, the bearer information and the second IP address that are assigned by the second AG.

After this step is implemented, downlink data of the UE is forwarded to the UE by the first AG through the second AG.

In this step, if the UE initiates the TAU request message, the MME sends a TAU accept message to the UE, where the TAU accept message includes the foregoing bearer information and the second IP address; or if the UE sends the service request message, the MME sends the foregoing bearer information and the second IP address to the UE by means of a radio bearer establishment process.

S608: After receiving the bearer information and the second IP address that are assigned by the second AG, the UE notifies, according to the bearer information, a service peer end that an IP address of the UE is changed from a first IP address assigned by the first AG to the second IP address assigned by the second AG, so that the service peer end changes a service path on which data is transmitted to the UE.

In this step, after the UE sends the second IP address to the service peer end, the service peer end transfers service data to a new service path for transmission, that is, data of the UE is sent to the second AG according to the second IP address and is forwarded to the UE by the second AG.

In specific implementation, the service peer end may also transmit the data of the UE in parallel on a new path and an old path, that is, same data is transmitted on the new path and the old path, where data transmitted on the new path and data transmitted on the old path are used as backups for each other. During specific implementation, a transmission manner may be selected according to an actual requirement of service transmission.

Optionally, after transferring the service data to the new path for transmission, the UE may instruct the service peer end to close or release the old path; or the service peer end may release the old path when data cannot be detected, for a period of time, on the old path.

The foregoing service peer end may be a service server, a service terminal, or the like. The foregoing service path refers to a connection channel used to transmit data, and may be a Subflow based on the Multipath Transfer Control Protocol (MPTCP) or the Multipath Real-time Transport Protocol (MPRTP), or may be a connection channel based on general forms such as TCP, RTP, GRE, and IPSec. A multipath protocol may be customized by the UE and the service peer end. If the service peer end does not support multipath, an MPTCP proxy, MPRTP Proxy, or the like may be set between the UE and the service peer end to support multipath transmission, so as to avoid service interruption caused by that the UE changes the IP address.

Specifically, if a connection manner based on the MPTCP is used between the UE and the service peer end, the UE may send a TCP synchronous (SYNC) message to the service peer end, and add a TCP option for creating a TCP connection to the message, for example, MP_JOIN (which means adding a Subflow), and for another example, ADD_ADDR (which means adding an address), and may instruct, by using the two TCP Options, the service peer end to create a new subflow based on the second IP address of the UE. Optionally, the UE may instruct, in a manner of setting a priority of a Subflow, the service peer end to perform service path switching, for example, the UE notifies the service peer end that a priority of the foregoing created Subflow is higher to a priority of a previous Subflow that is for the UE, so as to instruct the service peer end to transfer the service data to the new Subflow for transmission. Optionally, after determining service path switching is complete, the UE may instruct, by sending DATA FIN (which means a terminating message), the service peer end to close the old service path that is for the UE.

If a connection manner based on the MPRTP is used between the UE and the service peer end, a service path switching process is similar to the foregoing process, but considering that real-time services, such as voice and video, have a relatively high requirement on quality of service, a manner of parallel transmission on a new path and an old path may be used to reduce service interruption probability and reduce a packet loss rate.

S609: After determining that service path transition is complete, the UE sends a service path change notification message to the MME.

If in step S601, the UE sends the TAU request message, the UE may send the service path change notification message to the MME by adding the service path change notification message into a TAU complete message.

Before step S609, that is, before determining that the service path transition is complete, the UE may directly send uplink data to the service peer end through the second AG, or may send uplink data to the second AG, and then, the uplink data is forwarded by the second AG to the first AG and sent to the service peer end by the first AG.

S610: After receiving the service path change notification message sent by the UE, the MME instructs the first AG to release a session between the first AG and the UE, which specifically includes releasing a bearer resource for communication between the first AG and the UE, and releasing the forwarding path and the first IP address of the UE.

S611: The MME instructs the second AG to release the forwarding path between the second AG and the first AG.

Figure 7:
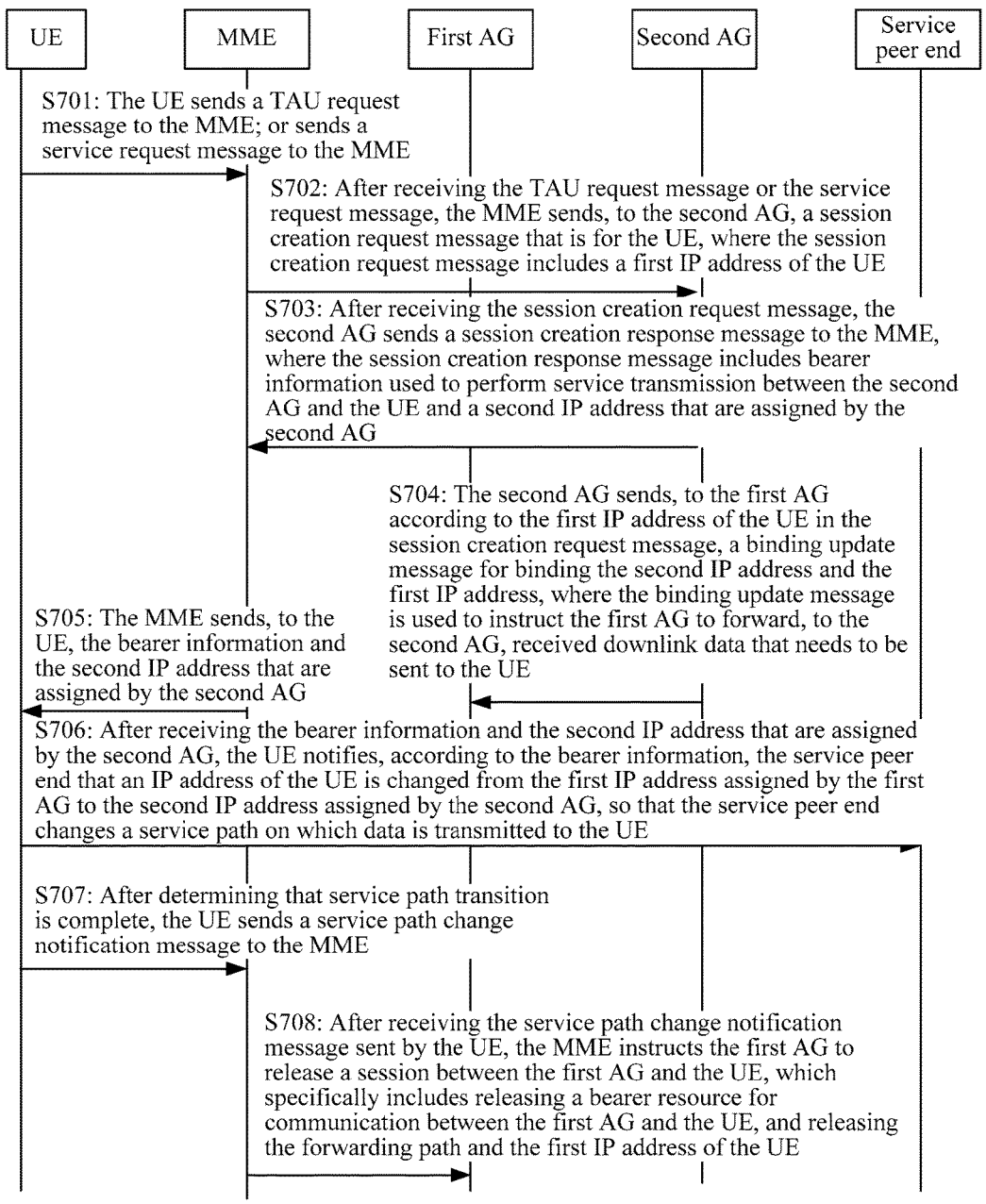
FIG. 7 is a flowchart of a service path changing method according to Embodiment 6 of the present disclosure.

As shown in FIG. 7, FIG. 7 is a flowchart of a service path changing method according to Embodiment 6 of the present disclosure. In this embodiment, an MME initiates session establishment, and a UE or a second AG initiates to establish a forwarding path between a first AG and the second AG. The service path changing method includes:

S701: The UE sends a TAU request message to the MIME; or sends a service request message to the MME.

S702: After receiving the TAU request message or the service request message, the MME sends, to the second AG, a session creation request message that is for the UE, where the session creation request message includes a first IP address of the UE.

S703: After receiving the session creation request message, the second AG sends a session creation response message to the MME, where the session creation response message includes bearer information used to perform service transmission between the second AG and the UE and a second IP address that are assigned by the second AG.

S704: The second AG sends, to the first AG according to the first IP address of the UE in the session creation request message, a binding update message for binding the second IP address and the first IP address, where the binding update message is used to instruct the first AG to forward, to the second AG, received downlink data that needs to be sent to the UE.

The foregoing binding update message may be initiated based on an MIPv4 binding update process or a PMIPv6 binding update process.

S705: The MME sends, to the UE, the bearer information and the second IP address that are assigned by the second AG.

Optionally, the binding update message in step S704 may also be sent, after step S705, to the first AG by the UE through the second AG.

S706: After receiving the bearer information and the second IP address that are assigned by the second AG, the UE notifies, according to the bearer information, a service peer end that an IP address of the UE is changed from the first IP address assigned by the first AG to the second IP address assigned by the second AG, so that the service peer end changes a service path on which data is transmitted to the UE.

S707: After determining that service path transition is complete, the UE sends a service path change notification message to the MME.

If in step S701, the UE sends the TAU request message, the UE may send the service path change notification message to the MME by adding the service path change notification message into a TAU complete message.

Before step S707, that is, before determining that the service path transition is complete, the UE may directly send uplink data to the service peer end through the second AG, or may send uplink data to the second AG, and then, the uplink data is forwarded by the second AG to the first AG and sent to the service peer end by the first AG.

S708: After receiving the service path change notification message sent by the UE, the MME instructs the first AG to release a session between the first AG and the UE, which specifically includes releasing a bearer resource for communication between the first AG and the UE, and releasing the forwarding path and the first IP address of the UE.

Figure 8:
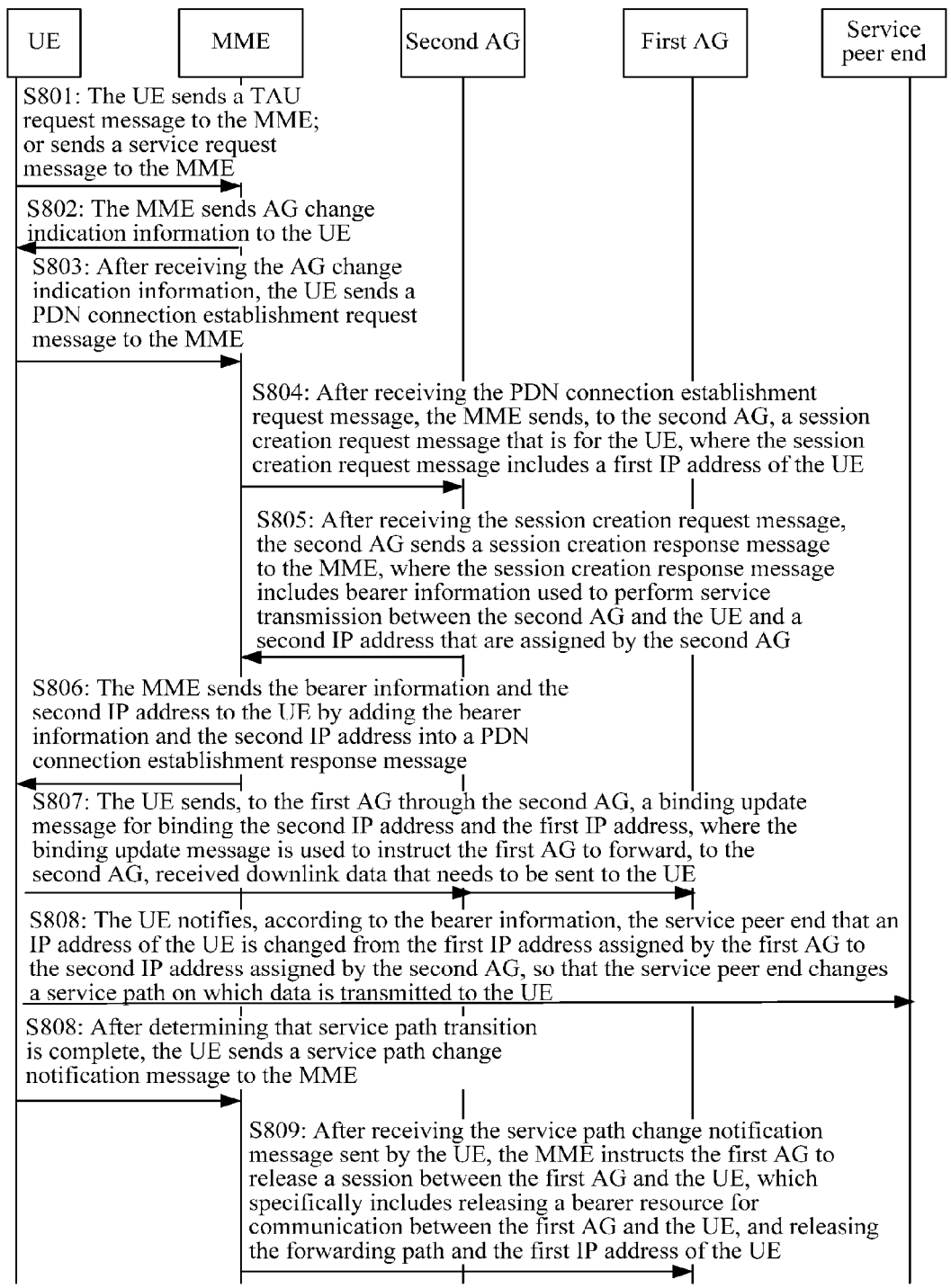
FIG. 8 is a flowchart of a service path changing method according to Embodiment 7 of the present disclosure.

As shown in FIG. 8, FIG. 8 is a flowchart of a service path changing method according to Embodiment 7 of the present disclosure. In this embodiment, a UE initiates session establishment. The service path changing method includes:

S801: The UE sends a TAU request message to an MME; or sends a service request message to an MME.

S802: The MME sends AG change indication information to the UE.

S803: After receiving the AG change indication information, the UE sends a PDN connection establishment request message to the MME.

S804: After receiving the PDN connection establishment request message, the MME sends, to the second AG, a session creation request message that is for the UE, where the session creation request message includes a first IP address of the UE.

S805: After receiving the session creation request message, the second AG sends a session creation response message to the MME, where the session creation response message includes bearer information used to perform service transmission between the second AG and the UE and a second IP address that are assigned by the second AG.

In this step, the session creation response message may include only the bearer information assigned by the second AG to the UE, and after the MME sends the bearer information to the UE, the UE may request, according to the bearer information and based on protocols such as the Dynamic Host Configuration Service (DHCP), Remote Authentication Dial In User Service (RADIUS), or Diameter, to acquire the second IP address from the second AG; and in this case, the Diameter Protocol is a newer version of the RADIUS Protocol.

S806: The MME sends the bearer information and the second IP address to the UE by adding the bearer information and the second IP address into a PDN connection establishment response message.

S807: The UE sends, to a first AG through the second AG, a binding update message for binding the second IP address and the first IP address, where the binding update message is used to instruct the first AG to forward, to the second AG, received downlink data that needs to be sent to the UE.

The binding update message herein may be initiated based on an MIPv4 binding update process or a PMIPv6 binding update process.

The foregoing binding update message may also be directly initiated by the second AG; or in this case, for forwarding path creating, reference may further be made to the foregoing specific implementation in Embodiment 1 and Embodiment 5. Optionally, the PDN connection establishment request message in step S803 may further include instruction information for creating a forwarding path, or may further include the first IP address of the UE; and the MME initiates a creating process of a forwarding path between the second AG and the first AG according to the instruction information. The instruction information herein may be in a form of an information element, and specifically, may be a set value of an existing information element.

S808: The UE notifies, according to the bearer information, a service peer end that an IP address of the UE is changed from the first IP address assigned by the first AG to the second IP address assigned by the second AG, so that the service peer end changes a service path on which data is transmitted to the UE.

S808: After determining that service path transition is complete, the UE sends a service path change notification message to the MME.

If in step S801, the UE sends the TAU request message, the UE may send the service path change notification message to the MME by adding the service path change notification message into a TAU complete message.

Before step S808, that is, before determining that the service path transition is complete, the UE may directly send uplink data to the service peer end through the second AG, or may send uplink data to the second AG, and then, the uplink data is forwarded by the second AG to the first AG and sent to the service peer end by the first AG.

S809: After receiving the service path change notification message sent by the UE, the MME instructs the first AG to release a session between the first AG and the UE, which specifically includes releasing a bearer resource for communication between the first AG and the UE, and releasing the forwarding path and the first IP address of the UE.

Based on a same inventive conception, the embodiments of the present disclosure further provide a service path changing apparatus that is corresponding to the service path changing method, and because a problem-solving principle of the apparatus is similar to that of the service path changing method in the embodiments of the present disclosure, for implementation of the apparatus, reference may be made to the implementation of the method, and repeated descriptions are not repeatedly described herein.

Figure 9:
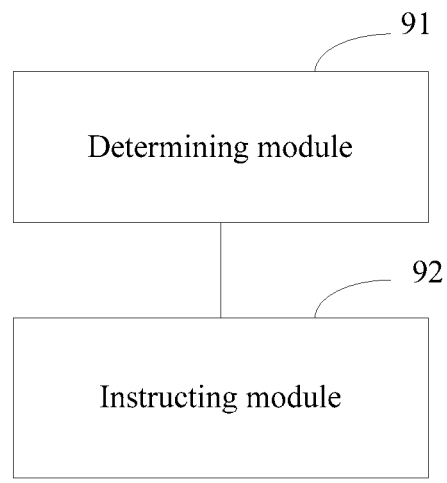
FIG. 9 is a schematic structural diagram of a service path changing apparatus according to Embodiment 8 of the present disclosure.

As shown in FIG. 9, FIG. 9 is a schematic structural diagram of a service path changing apparatus according to Embodiment 8 of the present disclosure, where the apparatus may be disposed in a mobility management entity MME or may serve as an independent device, and includes:

a determining module 91, configured to determine that a user equipment UE needs to be handed over from a first access gateway AG to a second AG; and an instructing module 92, configured to instruct, according to a result determined by the determining module 91, the UE to notify, according to bearer information used to perform service transmission between the second AG and the UE and assigned by the second AG, a service peer end that an Internet Protocol IP address of the UE is changed from a first IP address assigned by the first AG to a second IP address assigned by the second AG.

Optionally, the determining module 91 is specifically configured to:

after receiving a tracking area update TAU request message sent by the UE, determine that the UE needs to be handed over from the first AG to the second AG; or after receiving a service request message used to request a service and sent by the UE, determine that the UE needs to be handed over from the first AG to the second AG.

Optionally, the instructing module 92 is further configured to:

after the determining module 91 determines that the UE needs to be handed over from the first AG to the second AG, and before the instructing module 92 instructs the UE to notify the service peer end that the IP address of the UE is changed from the first IP address to the second IP address, send, to the second AG, a session creation request message that is for the UE and used to request to establish a session connection between the second AG and the UE, and receive a session creation response message sent by the second AG.

The session creation response message includes the bearer information and the second IP address that are assigned by the second AG; or the session creation response message includes the bearer information assigned by the second AG.

Optionally, if the session creation response message includes the bearer information and the second IP address, the instructing module 92 is specifically configured to send the bearer information and the second IP address to the UE, and instruct the UE to notify, according to the bearer information, the service peer end of the second IP address and the first IP address that is assigned by the first AG; or if the session creation response message includes the bearer information, the instructing module 92 is specifically configured to send the bearer information to the UE, and instruct the UE to request, according to the bearer information, to acquire the second IP address from the second AG, and to notify the service peer end of the second IP address and the first IP address that is assigned by the first AG.

Optionally, the instructing module 92 is specifically configured to:

send AG change indication information to the UE; and after it is determined that a packet data network PDN connection establishment request message sent by the UE according to the AG change indication information is received, send the session creation request message to the second AG.

Optionally, the session creation request message includes indication information used to indicate that an AG last accessed by the UE before the UE accesses the second AG is not the second AG, and the session creation response message further includes forwarding path destination end information.

The instructing module 92 is further configured to: after receiving the session creation response message sent by the second AG, and before instructing the UE to notify the service peer end that the IP address of the UE is changed from the first IP address to the second IP address, send a forwarding path creation request message including the forwarding path destination end information to the first AG, and receive forwarding path start end information sent by the first AG, where the forwarding path creation request message is used to instruct the first AG to forward, to the second AG, received downlink data that needs to be sent to the UE; and send the received forwarding path start end information to the second AG.

Optionally, the session creation request message includes the first IP address of the UE, where the first IP address is used to instruct the second AG to send, to the first AG, a binding update message for binding the second IP address and the first IP address, where the binding update message is used to instruct the first AG to forward, to the second AG, received downlink data that needs to be sent to the UE.

Optionally, the instructing module 92 is further configured to: after the instructing module 92 instructs the UE to notify the service peer end that the IP address of the UE is changed from the first IP address to the second IP address, if the instructing module 92 receives a service path change notification message sent by the UE, instruct the first AG to release a session between the first AG and the UE.

Figure 10:
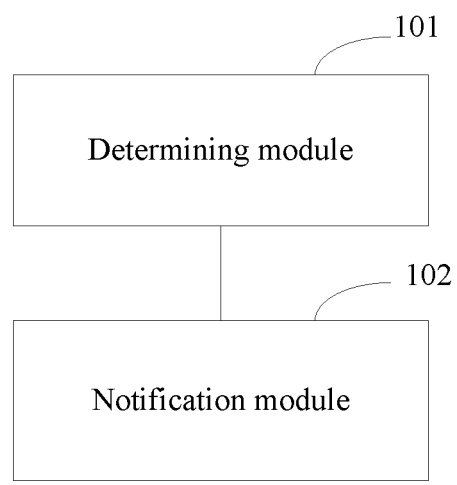
FIG. 10 is a schematic structural diagram of a service path changing apparatus according to Embodiment 9 of the present disclosure.

As shown in FIG. 10, FIG. 10 is a schematic structural diagram of a service path changing apparatus according to Embodiment 9 of the present disclosure, where the apparatus may be disposed in a user equipment UE or may serve as an independent device, and includes:

a determining module 101, configured to determine that a user equipment UE needs to be handed over from a first access gateway AG to a second AG; and a notification module 102, configured to notify, according to a result determined by the determining module 101, a service peer end that an Internet Protocol IP address of the UE is changed from a first IP address assigned by the first AG to a second IP address assigned by the second AG.

Optionally, the determining module 101 is specifically configured to receive bearer information used to perform service transmission between the second AG and the UE and the second IP address that are assigned by the second AG and sent by a mobility management entity MME.

The notification module 102 is specifically configured to notify, according to the bearer information, the service peer end of the second IP address assigned by the second AG and the first IP address assigned by the first AG.

Optionally, the determining module 101 is specifically configured to receive bearer information used to perform service transmission between the second AG and the UE, assigned by the second AG, and sent by a mobility management entity MME; and the notification module 102 is specifically configured to request, according to the bearer information, to acquire the second IP address from the second AG, and notify the service peer end of the acquired second IP address and the first IP address that is assigned by the first AG.

Optionally, the determining module 101 is specifically configured to:

after sending a tracking area update TAU request message to the mobility management entity MME, determine, according to TAU accept information sent by the MME, that the UE needs to be handed over from the first access gateway AG to the second access gateway AG; or after sending a service request message to the MME, determine, according to a radio bearer establishment response message sent by the MME, that the UE needs to be handed over from the first access gateway AG to the second access gateway AG.

Optionally, the determining module 101 is specifically configured to:

after the determining module 101 sends a tracking area update TAU request message or a service request message to the mobility management entity MME, if the determining module 101 receives AG change indication information sent by the MME, send a packet data network PDN connection establishment request message to the MME; and after receiving a PDN connection establishment response message that is sent, according to the PDN connection establishment request message, by the MME, determine that the UE needs to be handed over from the first access gateway AG to the second access gateway AG.

Optionally, the notification module 102 is specifically configured to:

after the determining module 101 determines that the UE needs to be handed over from the first AG to the second AG, and before the notification module 102 notifies the service peer end that the IP address of the UE is changed from the first IP address to the second IP address, send, to the first AG through the second AG, a binding update message for binding the second IP address and the first IP address, where the binding update message is used to instruct the first AG to forward, to the second AG, received downlink data that needs to be sent to the UE.

Optionally, the notification module 102 is specifically configured to:

after notifying the service peer end that the IP address of the UE is changed from the first IP address to the second IP address, send a service path change notification message to the mobility management entity MME, so that the MME instructs the first AG to release a session between the first AG and the UE.

Figure 11:
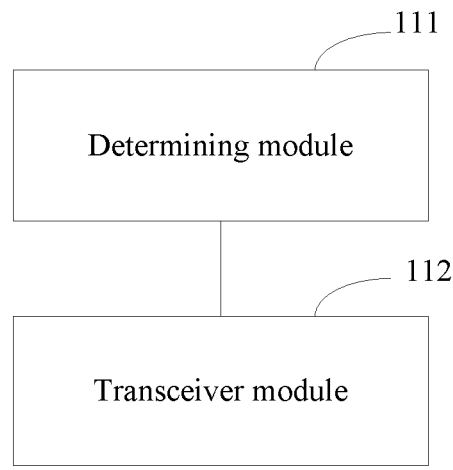
FIG. 11 is a schematic structural diagram of a service path changing apparatus according to Embodiment 10 of the present disclosure.

As shown in FIG. 11, FIG. 11 is a schematic structural diagram of a service path changing apparatus according to Embodiment 10 of the present disclosure, where the apparatus may be disposed in a first AG or may serve as an independent device, and includes:

a determining module 111, configured to determine that a user equipment UE needs to be handed over from a first access gateway AG to a second AG that assigns a second Internet Protocol IP address to the UE; and a transceiver module 112, configured to forward, to the second AG according to a result determined by the determining module 111, downlink data that needs to be sent to the UE.

Optionally, the determining module 111 is specifically configured to:

after the transceiver module 112 receives a forwarding path creation request message sent by a mobility management entity MME, determine that the UE needs to be handed over from the first AG to the second AG, where the forwarding path creation request message includes forwarding path destination end information; or after the transceiver module 112 receives a binding update message sent by the second AG, where the binding update message is for binding the second IP address and a first IP address that is assigned to the UE by the first AG, determine that the UE needs to be handed over from the first AG to the second AG.

Optionally, the transceiver module 112 is further configured to: after receiving the forwarding path creation request message sent by the MME, and before forwarding, to the second AG, the downlink data that needs to be sent to the UE, send the forwarding path start end information to the second AG through the MME.

Optionally, the determining module 111 is further configured to: after the transceiver module 112 forwards, to the second AG, the downlink data that needs to be sent to the UE, if it is determined that the transceiver module 112 receives instruction information that is for releasing a session between the first AG and the UE and sent by the MME, release the session between the first AG and the UE.

Figure 12:
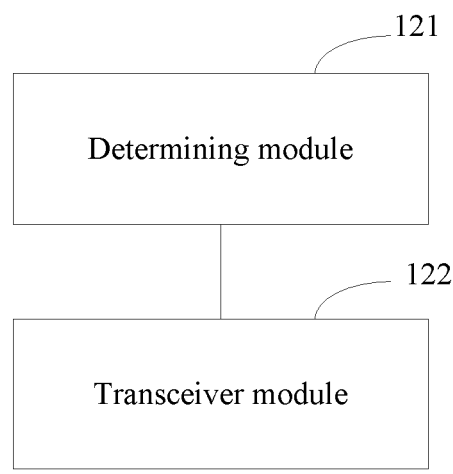
FIG. 12 is a schematic structural diagram of a service path changing apparatus according to Embodiment 11 of the present disclosure.

As shown in FIG. 12, FIG. 12 is a schematic structural diagram of a service path changing apparatus according to Embodiment 11 of the present disclosure, where the apparatus may be disposed in a second AG or may serve as an independent device, and includes:

a determining module 121, configured to determine that a user equipment UE needs to access a second AG, where an AG that is last accessed by the UE is a first AG; and a transceiver module 122, configured to assign, to the UE according to a result determined by the determining module 121, a second IP address and bearer information that is used to perform service transmission between the second AG and the UE, so that the UE notifies, according to the bearer information, a service peer end that an IP address of the UE is changed from a first IP address assigned by the first AG to the second IP address assigned by the second AG.

Optionally, the determining module 121 is specifically configured to: after the transceiver module 122 receives a session creation request message sent by a mobility management entity MME, determine that the UE needs to access the second AG.

The transceiver module 122 is specifically configured to send a session creation response message to the MME, where the session creation response message includes the bearer information and the second IP address; or send a session creation response message to the MME, where the session creation response message includes the bearer information; and after the second AG receives information for requesting to acquire an IP address and sent by the UE according to the bearer information, the second AG assigns the second IP address to the UE.

Optionally, the session creation request message includes indication information indicating that an AG previously accessed by the UE is not the second AG, and the session creation response message further includes forwarding path destination end information.

The transceiver module 122 is further configured to: after sending the session creation response message to the MME, receive forwarding path start end information sent by the MME; and receive, according to the forwarding path start end information, downlink data that needs to be sent to the UE and is forwarded by the first AG, and send the received downlink data to the UE.

Optionally, the session creation request message includes the first IP address of the UE.

The transceiver module 122 is further configured to: after receiving the session creation request message sent by the MME and sending the session creation response message to the MME, send, to the first AG according to the first IP address, a binding update message for binding the second IP address and the first IP address, where the binding update message is used to instruct the first AG to forward, to the second AG, received downlink data that needs to be sent to the UE.

Figure 13:
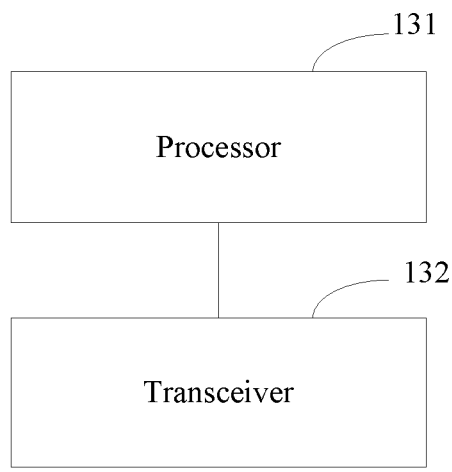
FIG. 13 is a schematic structural diagram of an entity apparatus for changing a service path according to Embodiment 12 of the present disclosure.

As shown in FIG. 13, FIG. 13 is a schematic structural diagram of an entity apparatus for changing a service path according to Embodiment 12 of the present disclosure, where the entity apparatus may specifically be a mobility management entity MME, and includes:

a processor 131, configured to determine that a user equipment UE needs to be handed over from a first access gateway AG to a second AG; and a transceiver 132, configured to instruct, according to a result determined by the processor 131, the UE to notify, according to bearer information used to perform service transmission between the second AG and the UE and assigned by the second AG, a service peer end that an Internet Protocol IP address of the UE is changed from a first IP address assigned by the first AG to a second IP address assigned by the second AG.

Optionally, the processor 131 is specifically configured to:

after the transceiver 132 receives a tracking area update TAU request message sent by the UE, determine that the UE needs to be handed over from the first AG to the second AG; or after the transceiver 132 receives a service request message used to request a service and sent by the UE, determine that the UE needs to be handed over from the first AG to the second AG.

Optionally, the transceiver 132 is further configured to:

after the processor 131 determines that the UE needs to be handed over from the first AG to the second AG, and before the transceiver 132 instructs the UE to notify the service peer end that the IP address of the UE is changed from the first IP address to the second IP address, send, to the second AG, a session creation request message that is for the UE and used to request to establish a session connection between the second AG and the UE, and receive a session creation response message sent by the second AG.

The session creation response message includes the bearer information and the second IP address that are assigned by the second AG; or the session creation response message includes the bearer information assigned by the second AG.

Optionally, if the session creation response message includes the bearer information and the second IP address, the transceiver 132 is specifically configured to send the bearer information and the second IP address to the UE, and instruct the UE to notify, according to the bearer information, the service peer end of the second IP address and the first IP address that is assigned by the first AG; or if the session creation response message includes the bearer information, the transceiver 132 is specifically configured to send the bearer information to the UE, and instruct the UE to request, according to the bearer information, to acquire the second IP address from the second AG, and to notify the service peer end of the second IP address and the first IP address that is assigned by the first AG.

Optionally, the transceiver 132 is specifically configured to: send AG change indication information to the UE; and after receiving a packet data network PDN connection establishment request message that is sent, according to the AG change indication information, by the UE, send the session creation request message to the second AG.

Optionally, the session creation request message includes indication information used to indicate that an AG last accessed by the UE before the UE accesses the second AG is not the second AG, and the session creation response message further includes forwarding path destination end information.

The transceiver 132 is further configured to: after receiving the session creation response message sent by the second AG, and before instructing the UE to notify the service peer end that the IP address of the UE is changed from the first IP address to the second IP address, send a forwarding path creation request message including the forwarding path destination end information to the first AG, and receive forwarding path start end information sent by the first AG, where the forwarding path creation request message is used to instruct the first AG to forward, to the second AG, received downlink data that needs to be sent to the UE; and send the received forwarding path start end information to the second AG.

Optionally, the session creation request message includes the first IP address of the UE, where the first IP address is used to instruct the second AG to send, to the first AG, a binding update message for binding the second IP address and the first IP address, where the binding update message is used to instruct the first AG to forward, to the second AG, received downlink data that needs to be sent to the UE.

Optionally, the transceiver 132 is further configured to: after the transceiver 132 instructs the UE to notify the service peer end that the IP address of the UE is changed from the first IP address to the second IP address, if the transceiver 132 receives a service path change notification message sent by the UE, instruct the first AG to release a session between the first AG and the UE.

Figure 14:
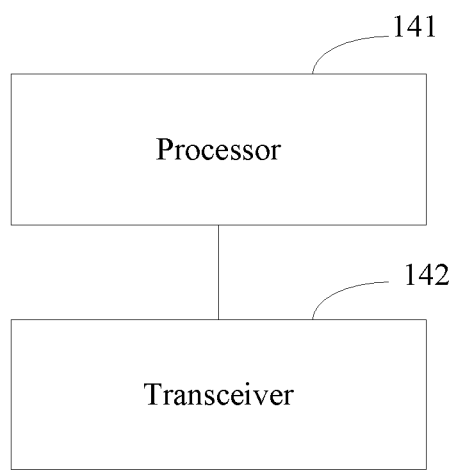
FIG. 14 is a schematic structural diagram of an entity apparatus for changing a service path according to Embodiment 13 of the present disclosure.

As shown in FIG. 14, FIG. 14 is a schematic structural diagram of an entity apparatus for changing a service path according to Embodiment 13 of the present disclosure, where the entity apparatus may specifically be a user equipment UE, and includes:

a processor 141, configured to determine that a user equipment UE needs to be handed over from a first access gateway AG to a second AG; and a transceiver 142, configured to notify a service peer end that an Internet Protocol IP address of the UE is changed from a first IP address assigned by the first AG to a second IP address assigned by the second AG.

Optionally, the processor 141 is specifically configured to: after the transceiver 142 receives bearer information used to perform service transmission between the second AG and the UE and the second IP address that are assigned by the second AG and sent by a mobility management entity MME, determine that the UE needs to be handed over from the first AG to the second AG.

The transceiver 142 is specifically configured to notify, according to the bearer information, the service peer end of the second IP address assigned by the second AG and the first IP address assigned by the first AG.

Optionally, the processor 141 is specifically configured to: after the transceiver 142 receives bearer information used to perform service transmission between the second AG and the UE, assigned by the second AG, and sent by a mobility management entity MME, determine that the UE needs to be handed over from the first AG to the second AG.

The transceiver 142 is specifically configured to request, according to the bearer information, to acquire the second IP address from the second AG, and notify the service peer end of the acquired second IP address and the first IP address that is assigned by the first AG.

Optionally, the transceiver 142 is specifically configured to send a tracking area update TAU request message to the mobility management entity MME, and receive TAU accept information sent by the MME; and the processor 141 is specifically configured to determine, according to the TAU accept information received by the transceiver 142, that the UE needs to be handed over from the first access gateway AG to the second AG; or the transceiver 142 is specifically configured to send a service request message to the MME, and receive a radio bearer establishment response message sent by the MME; and the processor 141 is specifically configured to determine, according to the radio bearer establishment response message received by the transceiver 142, that the UE needs to be handed over from the first AG to the second AG.

Optionally, the transceiver 142 is specifically configured to: after the transceiver 142 sends a tracking area update TAU request message or a service request message to the mobility management entity MME, if the transceiver 142 receives AG change indication information sent by the MME, send a packet data network PDN connection establishment request message to the MME.

The processor 141 is specifically configured to: after the transceiver 142 receives a PDN connection establishment response message that is sent, according to the PDN connection establishment request message, by the MME, determine that the UE needs to be handed over from the first AG to the second AG.

Optionally, the transceiver 142 is further configured to: after the processor 141 determines that the UE needs to be handed over from the first AG to the second AG, and before the transceiver 142 notifies the service peer end that the IP address of the UE is changed from the first IP address to the second IP address, send, to the first AG through the second AG, a binding update message for binding the second IP address and the first IP address, where the binding update message is used to instruct the first AG to forward, to the second AG, received downlink data that needs to be sent to the UE.

Optionally, the transceiver 142 is further configured to: after notifying the service peer end that the IP address of the UE is changed from the first IP address to the second IP address, send a service path change notification message to the mobility management entity MME, so that the MME instructs the first AG to release a session between the first AG and the UE.

Figure 15:
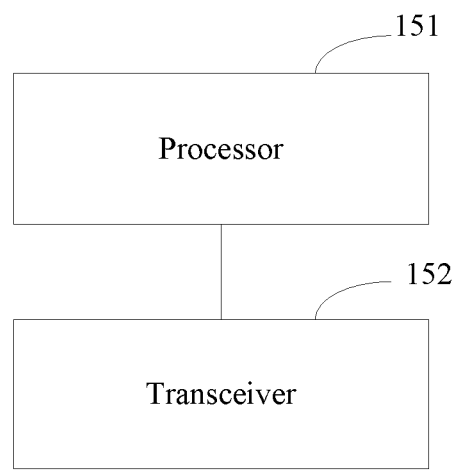
FIG. 15 is a schematic structural diagram of an entity apparatus for changing a service path according to Embodiment 14 of the present disclosure.

As shown in FIG. 15, FIG. 15 is a schematic structural diagram of an entity apparatus for changing a service path according to Embodiment 14 of the present disclosure, where the entity apparatus may specifically be a first AG, and includes:

a processor 151, configured to determine that a user equipment UE needs to be handed over from a first access gateway AG to a second AG that assigns a second Internet Protocol IP address to the UE; and a transceiver 152, configured to forward, to the second AG according to a result determined by the processor 151, downlink data that needs to be sent to the UE.

Optionally, the processor 151 is specifically configured to:

after the transceiver 152 receives a forwarding path creation request message sent by a mobility management entity MME, determine that the UE needs to be handed over from the first AG to the second AG that assigns the second IP address to the UE, where the forwarding path creation request message includes forwarding path destination end information; or after the transceiver 152 receives a binding update message sent by the second AG, where the binding update message is for binding the second IP address and a first IP address that is assigned to the UE by the first AG, determine that the UE needs to be handed over from the first AG to the second AG that assigns the second IP address to the UE.

Optionally, the transceiver 152 is further configured to: after receiving the forwarding path creation request message sent by the MME, and before forwarding, to the second AG, the downlink data that needs to be sent to the UE, send the forwarding path start end information to the second AG through the MME.

Optionally, the processor 151 is further configured to: after the transceiver 152 forwards, to the second AG, the downlink data that needs to be sent to the UE, if the transceiver 152 receives instruction information that is for releasing a session between the first AG and the UE and sent by the mobility management entity MME, release the session between the first AG and the UE.

Figure 16:
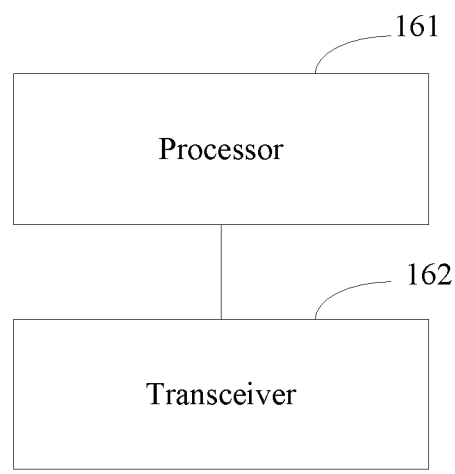
FIG. 16 is a schematic structural diagram of an entity apparatus for changing a service path according to Embodiment 15 of the present disclosure.

As shown in FIG. 16, FIG. 16 is a schematic structural diagram of an entity apparatus for changing a service path according to Embodiment 15 of the present disclosure, where the entity apparatus may specifically be a second AG, and includes:

a processor 161, configured to determine that a user equipment UE needs to access a second AG, where an access gateway AG that is last accessed by the UE is a first AG; and a transceiver 162, configured to assign, to the UE, a second Internet Protocol IP address and bearer information that is used to perform service transmission between the second AG and the UE, so that the UE notifies, according to the bearer information, a service peer end that an IP address of the UE is changed from a first IP address assigned by the first AG to the second IP address assigned by the second AG.

Optionally, the transceiver 162 is specifically configured to:

receive a session creation request message sent by a mobility management entity MME, and send a session creation response message to the MME, where the session creation response message includes the bearer information and the second IP address; or receive a session creation request message sent by a mobility management entity MME, and send a session creation response message to the MME, where the session creation response message includes the bearer information; and after the second AG receives information for requesting to acquire an IP address and sent by the UE according to the bearer information, the second AG assigns the second IP address to the UE.

Optionally, the session creation request message includes indication information indicating that an AG previously accessed by the UE is not the second AG, and the session creation response message further includes forwarding path destination end information.

The transceiver 162 is further configured to: after sending the session creation response message to the MME, receive forwarding path start end information sent by the MME; and receive, according to the forwarding path start end information, downlink data that needs to be sent to the UE and is forwarded by the first AG, and send the received downlink data to the UE.

Optionally, the session creation request message includes the first IP address of the UE.

The transceiver 162 is further configured to: after receiving the session creation request message sent by the MME and sending the session creation response message to the MME, send, to the first AG according to the first IP address, a binding update message for binding the second IP address and the first IP address, where the binding update message is used to instruct the first AG to forward, to the second AG, received downlink data that needs to be sent to the UE.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the apparatus (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A user equipment (UE), comprising: a processor, a transmitter coupled with the processor, and a receiver wherein:
the processor is configured to determine that the user equipment needs to be handed over from a first access gateway (AG) to a second AG;
the transmitter is configured to transmit to a service peer end, according to a result determined by the processor, a notification indicating that an Internet Protocol (IP) address of the UE changed from a first IP address assigned by the first AG to a second IP address assigned by the second AG;
the receiver is configured to receive bearer information used to perform service transmission between the second AG and the UE, and the second IP address that is assigned by the second AG and sent by a mobility management entity (MME); and
the transmitter is further configured to transmit to the service peer end, according to the bearer information, a notification of the second IP address assigned by the second AG and the first IP address assigned by the first AG.

2. The UE according to claim 1, wherein
the transmitter is further configured to transmit a request, according to the bearer information, to acquire the second IP address from the second AG, and transmit to the service peer end a notification of the acquired second IP address and the first IP address that is assigned by the first AG.

3. The UE according to claim 1, wherein the processor is configured to:
after the UE sends a tracking area update (TAU) request message to a mobility management entity MME, determine, according to TAU accept information sent by the MME, that the UE needs to be handed over from the first access gateway AG to the second access gateway AG; or
after the UE sends a service request message to the MME, determine, according to a radio bearer establishment response message sent by the MME, that the UE needs to be handed over from the first access gateway AG to the second access gateway AG.

4. The UE according to claim 1, wherein the processor is configured to:
after the UE sends a tracking area update (TAU) request message or a service request message to a mobility management entity (MME), if the UE receives AG change indication information sent by the MME, send a packet data network (PDN) connection establishment request message to the MME; and
after the UE receives a PDN connection establishment response message that is sent, according to the PDN connection establishment request message, by the MME, determine that the UE needs to be handed over from the first access gateway AG to the second access gateway AG.

5. The UE according to claim 1, wherein the transmitter is configured to:
after the UE determines that the UE needs to be handed over from the first AG to the second AG, and before the UE notifies the service peer end that the IP address of the UE is changed from the first IP address to the second IP address, send, to the first AG through the second AG, a binding update message for binding the second IP address and the first IP address, wherein the binding update message is used to instruct the first AG to forward, to the second AG, received downlink data that needs to be sent to the UE.

6. The UE according to claim 1, wherein the transmitter is configured to:
after the UE notifies the service peer end that the IP address of the UE is changed from the first IP address to the second IP address, send a service path change notification message to a mobility management entity MME, the service path change notification message is used for the MME to inform the first AG to release a session between the first AG and the UE.

7. A service path changing method, wherein the method comprises:
determining, by a mobility management entity (MME), that a user equipment (UE) needs to be handed over from a first access gateway (AG) to a second AG; and
instructing, by the MME, the UE to notify a service peer end, according to bearer information used to perform service transmission between the second AG and the UE and assigned by the second AG, an IP address of the UE is changed from a first IP address assigned by the first AG to a second IP address assigned by the second AG,
wherein after the determining, by the MME, that the UE needs to be handed over from the first AG to the second AG, and before the instructing, by the MME, the UE to notify the service peer end that the IP address of the UE is changed from the first IP address to the second IP address, the method further comprises:
sending, by the MME to the second AG, a session creation request message that is for the UE and used to request to establish a session connection between the second AG and the UE, and receiving a session creation response message sent by the second AG, and
wherein the session creation response message comprises the bearer information and the second IP address that are assigned by the second AG, and the instructing, by the MME, the UE to notify, according to bearer information, the service peer end that the IP address of the UE is changed from the first IP address to the second IP address comprises: sending, by the MME, the bearer information and the second IP address to the UE, and instructing the UE to notify, according to the bearer information, the service peer end of the second IP address and the first IP address that is assigned by the first AG.

8. The method according to claim 7, wherein the determining, by an MME, that a UE needs to be handed over from a first AG to a second AG comprises:
after the MME receives a tracking area update, TAU, request message sent by the UE, determining, by the MME, that the UE needs to be handed over from the first AG to the second AG; or
after the MME receives a service request message used to request a service and sent by the UE, determining, by the MME, that the UE needs to be handed over from the first AG to the second AG.

9. A service path changing method, wherein the method comprises:
determining, by a mobility management entity (MME), that a user equipment (UE) needs to be handed over from a first access gateway (AG) to a second AG; and
instructing, by the MME, the UE to notify a service peer end, according to bearer information used to perform service transmission between the second AG and the UE and assigned by the second AG, an IP address of the UE is changed from a first IP address assigned by the first AG to a second IP address assigned by the second AG,
wherein after the determining, by the MME, that the UE needs to be handed over from the first AG to the second AG, and before the instructing, by the MME, the UE to notify the service peer end that the IP address of the UE is changed from the first IP address to the second IP address, the method further comprises:
sending, by the MME to the second AG, a session creation request message that is for the UE and used to request to establish a session connection between the second AG and the UE, and receiving a session creation response message sent by the second AG, and
wherein the session creation response message comprises the bearer information assigned by the second AG, and the session creation response message comprises the bearer information, the instructing, by the MME, the UE to notify, according to the bearer information, the service peer end that the IP address of the UE is changed from the first IP address to the second IP address comprises: sending, by the MME, the bearer information to the UE, and instructing the UE to request, according to the bearer information, to acquire the second IP address from the second AG, and to notify the service peer end of the second IP address and the first IP address that is assigned by the first AG.

10. A service path changing method, wherein the method comprises:
determining, by a user equipment (UE) that the UE needs to be handed over from a first access gateway (AG) to a second AG;
notifying, by the UE, a service peer end that an IP address of the UE is changed from a first IP address assigned by the first AG to a second IP address assigned by the second AG; and
receiving, by the UE, bearer information used to perform service transmission between the second AG and the UE and the second IP address that are assigned by the second AG and sent by a mobility management entity (MME),
wherein the notifying, by the UE, the service peer end that the IP address of the UE is changed from the first IP address to the second IP address comprises: notifying, by the UE according to the bearer information, the service peer end of the second IP address assigned by the second AG and the first IP address assigned by the first AG.

11. The method according to claim 10, wherein the determining, by a UE, that the UE needs to be handed over from a first AG to a second AG comprises: receiving, by the UE, bearer information used to perform service transmission between the second AG and the UE, assigned by the second AG, and sent by a mobility management entity (MME); and the notifying, by the UE, a service peer end that an IP address of the UE is changed from a first IP address to a second IP address comprises: requesting, by the UE according to the bearer information, to acquire the second IP address from the second AG, and notifying the service peer end of the acquired second IP address and the first IP address that is assigned by the first AG.

12. The method according to claim 10, wherein the determining, by a UE, that the UE needs to be handed over from a first access gateway AG to a second access gateway AG comprises:
after the UE sends a tracking area update, TAU, request message to a mobility management entity (MME), determining, by the UE according to TAU accept information sent by the MME, that the UE needs to be handed over from the first access gateway AG to the second access gateway AG; or
after the UE sends a service request message to the MME, determining, by the UE according to a radio bearer establishment response message sent by the MME, that the UE needs to be handed over from the first AG to the second AG.

13. The method according to claim 10, wherein the determining, by a UE, that the UE needs to be handed over from a first AG to a second AG comprises:
after the UE sends a tracking area update TAU request message or a service request message to the mobility management entity MME, if the UE receives AG change indication information sent by the MME, sending, by the UE, a packet data network PDN connection establishment request message to the MME; and
after the UE receives a PDN connection establishment response message that is sent, according to the PDN connection establishment request message, by the MME, determining, by the UE, that the UE needs to be handed over from the first access gateway AG to the second access gateway AG.

14. The method according to claim 10, wherein after the determining, by a UE, that the UE needs to be handed over from a first AG to a second AG, and before the notifying, by the UE, a service peer end that an IP address of the UE is changed from a first IP address to a second IP address, the method further comprises:

sending, by the UE to the first AG through the second AG, a binding update message for binding the second IP address and the first IP address, wherein the binding update message is used to instruct the first AG to forward, to the second AG, received downlink data that needs to be sent to the UE.

15. The method according to claim 10, wherein after the notifying, by the UE, a service peer end that an IP address of the UE is changed from a first IP address to a second IP address, the method further comprises:

sending, by the UE, a service path change notification message to the MME, the service path change notification message is used for the MME to instruct the first AG to release a session between the first AG and the UE.

\* \* \* \* \*